United States Patent [19]

Kobayashi

[11] Patent Number: 5,537,484
[45] Date of Patent: Jul. 16, 1996

[54] METHOD AND APPARATUS FOR IMAGE PROCESSING

[75] Inventor: Tetsuji Kobayashi, Yokosuka, Japan

[73] Assignee: Nippon Telegraph and Telephone Corporation, Tokyo, Japan

[21] Appl. No.: 425,772

[22] Filed: Apr. 20, 1995

Related U.S. Application Data

[63] Continuation of Ser. No. 849,760, Mar. 11, 1992, abandoned.

[30] Foreign Application Priority Data

| Mar. 11, 1991 | [JP] | Japan | 3-045136 |
| Jul. 11, 1991 | [JP] | Japan | 3-171298 |
| Sep. 17, 1991 | [JP] | Japan | 3-236617 |
| Feb. 20, 1992 | [JP] | Japan | 4-033760 |

[51] Int. Cl.[6] .................................................. G06K 9/00
[52] U.S. Cl. ........................... 382/124; 382/219; 382/258
[58] Field of Search .................................... 382/124, 125, 382/209, 218, 219, 221, 227, 258, 259, 237

[56] References Cited

U.S. PATENT DOCUMENTS

| 5,105,467 | 4/1992 | Kim et al. ..................................... 382/4 |
| 5,109,428 | 4/1992 | Igaki et al. ................................... 382/4 |

FOREIGN PATENT DOCUMENTS

| 0295876 | 12/1988 | European Pat. Off. . | |
| 63-132386 | 6/1988 | Japan | G06K 9/00 |
| 3-77177 | 4/1991 | Japan | G06F 15/62 |

OTHER PUBLICATIONS

Hashimoto et al., "Automatic Fingerprint Classifier and its Application to Access Control," Transactions of the Institue of Electronics, Information & Communication Engineers of Japan, Vol. E73, No. 7, pp. 1120–1125, Jul. 1990.

Yahagi et al., "Moving–Window Algorithm for Fast Fingerprint Verification," Proceedings Southeastcon '90, Vol. 1/3, pp. 343–347, Apr. 1, 1990.
Patent Abstracts of Japan, Vol. 9, No. 239, (P–391) Sep. 25, 1985.
Database Inspec. Institute of Electrical Engineers, Abstract "A Dynamic Thresholding Method for Character Dection in Computer Scene Images," Inspec No. 3214996, May 1988.
Woodwark, "The Explicit Quad Tree as a Structure for Computer Graphics," Computer Journal, Vol. 25, No. 2, pp. 235–238, May 1982.
Ratkovic et al., "Concepts for a Next Generation Automated Fingerprint System," 1978 Carnahan Conference on Crime Countermeasures, pp. 157–161, May 1978.

(List continued on next page.)

*Primary Examiner*—Leo Boudreau
*Assistant Examiner*—Phuoc Tran
*Attorney, Agent, or Firm*—Finnegan, Henderson, Farabow, Garrett & Dunner

[57] ABSTRACT

Method and apparatus for image processing for comparing fingerprints and the like. To avoid reducing the accuracy of the comparison due to the variations of the fingerprint lines when the fingerprint input is made, a method has been resolved wherein the line width of the registered fingerprint is narrowed more than the line width of the tested fingerprint. Reduction of the throughput of recording and comparison is solved by the selective utilization of the input of an activated fingerprint image, the judging of the fingerprint boundaries and the processing of only the activated division, and, additionally, in the comparison, by midway abandonment, midway decision, multi-step variation of the increment, and/or introduction of a sub-template jump search. By introducing the degree of discordance between two images, it becomes possible to compare two images based on a comparison of the black pixels of the registered image to those of the image undergoing testing. As a result, the processing amount for position matching is reduced in comparison with the case when all black pixels of two images are checked, or the entire images, including black and white pixels, are checked.

11 Claims, 15 Drawing Sheets

OTHER PUBLICATIONS

Baruch, "Line Thinning by Line Following," Pattern Recognition Letters, Vol. 8, No. 4, pp. 271–276, Nov. 1988.

"Fingerprint Identification System by Ravin Thinning," by K. Yamamoto et al., Transactions of IEICE, Vol. J71–D, No. 2, pp. 327–335, 1988.

"Image Registration by Sequential Similarity Detection Algorithm," by M. Onoe et al., Journal of Information Processing Society of Japan, Vol, 17, No. 7, Jul. 1976, pp. 634–640.

"Personal Verification System with High Tolerance of Poor Quality Fingerprints," by K. Sasagawa et al., Transaction of IEICE, Vol. J72–D–II, No. 5, May 1989, pp. 707–714.

"Technological Trend of Fingerprint Verification System," by K. Sasagawa et al., Systems, Control and Information, Vol. 35, No. 7, Jul. 15, 1991, pp. 390–397.

"Two–Stage Template Meeting," by G. J. Vanderbrug et al., IEEE Transactions on Computers, Vol. 25, No. 4, Apr. 1977, pp. 384–393.

"Coarse–Fine Template Matching," by A. Rosenfeld et al., IEEE Transactions on Systems, Man, and Cybernetics, Vol. SMC–2, No. 2, Feb. 1977, pp. 104–107.

"A Fingerprint Image Recognition Method Using a Personal Computer," by T. Kobayashi, Proceedings of the Korea–Japan Joint Conference on Computer Vision, published Oct. 10, 1991, pp. 248–253.

"A Template Matching Scheme Using Thinned Images for Fingerprint Image Recognition," by T. Kobayashi, the 4th Symposium of Informatoin Theory and Its Applications (SITA '91), Ibusuki, Japn, published Dec. 11, 1991, pp. 217–220.

"A Processing Method for Fingerprint Images," by T. Kobayashi, IEICE Technical Report, IE91–75, published Nov. 21, 1991, pp. 13–18.

"A Thinning Method for Extracting Characteristic Points for an Image," by T. Kobayashi, IEICE Technical Reort, PRU90–149, published Mar. 19, 1991, pp. 33–38.

AN EXAMPLE OF A 3x3 PIXEL AGGREGATION

| P4 | P3 | P2 |
|----|----|----|
| P5 | P0 | P1 |
| P6 | P7 | P8 |

FIG. 3 (a)

AN EXAMPLE OF A 4x4 PIXEL AGGREGATION

| P15 | P14 | P13 | P12 |
|-----|-----|-----|-----|
| P11 | P10 | P9  | P8  |
| P7  | P6  | P5  | P4  |
| P3  | P2  | P1  | P0  |

FIG. 3 (b)

AN EXAMPLE OF A 4x3 PIXEL AGGREGATION

| P11 | P10 | P9 | P8 |
|-----|-----|----|----|
| P7  | P6  | P5 | P4 |
| P3  | P2  | P1 | P0 |

RT(0)={RTO1, RTO2, RTO3, RTO4, RTO5}, RB(0)={RTO1, RBO2, RBO3, RBO4}

(EX. 3)

(EX. 4)

AN EXAMPLE OF TABLE G SHOWING ACTIVATED REGIONS OF A FINGERPRINT (ELEMENTS ARE G(M,N)
*(FOR THE CASE WHERE K=16. "1" INDICATES ACTIVATION. "0" INDICATES NO ACTIVATION. THE SHAPE OF THE FINGERPRINT IS UNRELATED TO THE OTHER FIGURES.)

| N \ M | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 1 | 1 | 1 | 1 | 1 | 0 | 0 | 0 | 0 | 0 | 0 |
| 2 | 0 | 0 | 0 | 1 | 1 | 1 | 1 | 1 | 1 | 1 | 1 | 1 | 1 | 0 | 0 | 0 |
| 3 | 0 | 0 | 0 | 1 | 1 | 1 | 1 | 1 | 1 | 1 | 1 | 1 | 1 | 1 | 0 | 0 |
| 4 | 0 | 0 | 1 | 1 | 1 | 1 | 1 | 1 | 1 | 1 | 1 | 1 | 1 | 1 | 0 | 0 |
| 5 | 0 | 0 | 1 | 1 | 1 | 1 | 1 | 1 | 1 | 1 | 1 | 1 | 1 | 1 | 1 | 0 |
| 6 | 0 | 1 | 1 | 1 | 1 | 1 | 1 | 1 | 1 | 1 | 1 | 1 | 1 | 1 | 1 | 0 |
| 7 | 0 | 1 | 1 | 1 | 1 | 1 | 1 | 1 | 1 | 1 | 1 | 1 | 1 | 1 | 1 | 0 |
| 8 | 0 | 0 | 1 | 1 | 1 | 1 | 1 | 1 | 1 | 1 | 1 | 1 | 1 | 1 | 1 | 0 |
| 9 | 0 | 0 | 1 | 1 | 1 | 1 | 1 | 1 | 1 | 1 | 1 | 1 | 1 | 1 | 0 | 0 |
| 10 | 0 | 0 | 0 | 1 | 1 | 1 | 1 | 1 | 1 | 1 | 1 | 1 | 1 | 0 | 0 | 0 |
| 11 | 0 | 0 | 0 | 1 | 1 | 1 | 1 | 1 | 1 | 1 | 1 | 1 | 1 | 0 | 0 | 0 |
| 12 | 0 | 0 | 0 | 1 | 1 | 1 | 1 | 1 | 1 | 1 | 1 | 1 | 0 | 0 | 0 | 0 |
| 13 | 0 | 0 | 0 | 0 | 1 | 1 | 1 | 1 | 1 | 1 | 0 | 0 | 0 | 0 | 0 | 0 |
| 14 | 0 | 0 | 0 | 0 | 0 | 0 | 1 | 1 | 1 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |

*FIG. 5*

AN EXAMPLE OF A THINNING DECISION DATA TABLE FOR UNRESOLVED PIXELS

| Q | C.A. | Q | C.A. | Q | C.A. | Q | C.A. | Q | C.A. | Q | C.A. | Q | C.A. | Q | C.A. |
|---|---|---|---|---|---|---|---|---|---|---|---|---|---|---|---|
| 00 | 00 | 20 | 01 | 40 | 01 | 60 | 00 | 80 | 01 | A0 | 01 | C0 | 00 | E0 | 00 |
| 01 | 01 | 21 | 01 | 41 | 00 | 61 | 00 | 81 | 00 | A1 | 01 | C1 | 00 | E1 | 00 |
| 02 | 01 | 22 | 01 | 42 | 01 | 62 | 01 | 82 | 01 | A2 | 01 | C2 | 01 | E2 | 01 |
| 03 | 00 | 23 | 01 | 43 | 00 | 63 | 00 | 83 | 00 | A3 | 01 | C3 | 00 | E3 | 00 |
| 04 | 01 | 24 | 01 | 44 | 01 | 64 | 01 | 84 | 01 | A4 | 01 | C4 | 01 | E4 | 01 |
| 05 | 00 | 25 | 01 | 45 | 00 | 65 | 00 | 85 | 00 | A5 | 01 | C5 | 00 | E5 | 00 |
| 06 | 00 | 26 | 01 | 46 | 01 | 66 | 01 | 86 | 01 | A6 | 01 | C6 | 01 | E6 | 01 |
| 07 | 00 | 27 | 01 | 47 | 00 | 67 | 00 | 87 | 00 | A7 | 01 | C7 | 00 | E7 | 00 |
| 08 | 01 | 28 | 01 | 48 | 01 | 68 | 01 | 88 | 01 | A8 | 01 | C8 | 01 | E8 | 01 |
| 09 | 01 | 29 | 01 | 49 | 01 | 69 | 01 | 89 | 01 | A9 | 01 | C9 | 01 | E9 | 01 |
| 0A | 01 | 2A | 01 | 4A | 01 | 6A | 01 | 8A | 01 | AA | 01 | CA | 01 | EA | 02 |
| 0B | 01 | 2B | 01 | AB | 01 | 6B | 01 | 8B | 01 | AB | 01 | CB | 01 | EB | 03 |
| 0C | 00 | 2C | 01 | 4C | 01 | 6C | 01 | 8C | 01 | AC | 01 | CC | 01 | EC | 01 |
| 0D | 00 | 2D | 01 | 4D | 00 | 6D | 00 | 8D | 00 | AD | 01 | CD | 00 | ED | 00 |
| 0E | 00 | 2E | 01 | 4E | 01 | 6E | 01 | 8E | 01 | AE | 01 | CE | 01 | EE | 01 |
| 0F | 00 | 2F | 01 | 4F | 00 | 6F | 00 | 8F | 00 | AF | 01 | CF | 00 | EF | 00 |
| 10 | 01 | 30 | 00 | 50 | 00 | 70 | 00 | 90 | 01 | B0 | 01 | D0 | 00 | F0 | 00 |
| 11 | 01 | 31 | 01 | 51 | 00 | 71 | 00 | 91 | 01 | B1 | 01 | D1 | 00 | F1 | 00 |
| 12 | 01 | 32 | 01 | 52 | 01 | 72 | 01 | 92 | 01 | B2 | 01 | D2 | 01 | F2 | 01 |
| 13 | 01 | 33 | 01 | 53 | 00 | 73 | 00 | 93 | 01 | B3 | 01 | D3 | 00 | F3 | 00 |
| 14 | 00 | 34 | 00 | 54 | 00 | 74 | 00 | 94 | 01 | B4 | 01 | D4 | 00 | F4 | 00 |
| 15 | 00 | 35 | 00 | 55 | 01 | 75 | 00 | 95 | 00 | B5 | 00 | D5 | 00 | F5 | 00 |
| 16 | 00 | 36 | 00 | 56 | 00 | 76 | 00 | 96 | 01 | B6 | 01 | D6 | 00 | F6 | 00 |
| 17 | 00 | 37 | 00 | 57 | 00 | 77 | 00 | 97 | 00 | B7 | 00 | D7 | 00 | F7 | 00 |
| 18 | 00 | 38 | 00 | 58 | 00 | 78 | 00 | 98 | 01 | B8 | 01 | D8 | 00 | F8 | 00 |
| 19 | 01 | 39 | 01 | 59 | 00 | 79 | 00 | 99 | 01 | B9 | 01 | D9 | 00 | F9 | 00 |
| 1A | 01 | 3A | 01 | 5A | 01 | 7A | 01 | 9A | 01 | BA | 01 | DA | 01 | FA | 01 |
| 1B | 01 | 3B | 01 | 5B | 00 | 7B | 00 | 9B | 01 | BB | 01 | DB | 00 | FB | 00 |
| 1C | 00 | 3C | 00 | 5C | 00 | 7C | 00 | 9C | 01 | BC | 01 | DC | 00 | FC | 00 |
| 1D | 00 | 3D | 00 | 5D | 00 | 7D | 00 | 9D | 00 | BD | 00 | DD | 00 | FD | 00 |
| 1E | 00 | 3E | 00 | 5E | 00 | 7E | 00 | 9E | 01 | BE | 01 | DE | 00 | FE | 00 |
| 1F | 00 | 3F | 00 | 5F | 00 | 7F | 00 | 9F | 00 | BF | 00 | DF | 00 | FF | 00 |

(ITEM NUMBER Q IS A HEXADECIMAL DIGIT INDICATOR. Q DOES NOT EXIST IN MEMORY)
C.A.=CONVERSION ASSORTMENT

FIG. 12

METHOD AND APPARATUS FOR IMAGE PROCESSING

This application is a continuation of application Ser. No. 07/849,760, filed Mar. 11, 1992, now abandoned.

BACKGROUND OF THE INVENTION

1. Field of the Invention

The present invention relates to an image processing device and a method thereof, wherein, when carrying out pattern recognition on a digitalized image (fingerprints, stamped images, diagrams, letter characters, etc.) through use of an image processing device (hardware/software in a computer, an electronic switching machine a communication control unit, an IC card, an image recognition device, an image matching device, an image testing device, or the like), the image information for registration use is recorded in a memory device. This image processing device and the method thereof being further utilized to carry out a determination as to whether or not two images are identical through a comparison of the concordance (concordant match) between the two images.

2. Prior Art

The case where the image is a fingerprint will be presented as an example of an image on which pattern recognition is to be conducted. A fingerprint is the pattern of the ridges of a finger. Furthermore, because through valley lines (the space between the ridges) are set by ridges, in place of using a pattern showing ridges, it is acceptable to use a pattern showing through valley lines as the fingerprint. The lines treated as a fingerprint shall be called "fingerprint lines". There are a variety of fingerprint input devices for confirming an individual's identity, such as the method of input from an image pick-up device (for example, a CCD (charge coupled device) camera), the prism method (for example, Shimizu et al., "Entry Method of Fingerprint Image with Prism-Comparison between the Total Reflection Method and Light-Path Separation Method", IECE Journal, Vol. J68-D, No. 3, pp. 414–415 (1985)), and the hologram method (for example, Igaki, et al., "Personal Identification Terminal using Holographic Fingerprint Sensor", Institute of Electronics Information and Communication Engineers of Japan (IEICE) Technical Report, PRU 87-31, pp. 27–33, (1987)). The fingerprint image of analog information input from an image pick-up device is converted into a gray scale image of a digitized fingerprint by an analog/digital converter. This gray scale image of the fingerprint is indicated by coordinate (X,Y), which is the image memory pixel address, and by the brightness of the pixels, which is a component of each pixel address of image memory. The scheme of setting the X and Y axes is freely chosen. A fingerprint image may be formed by converting the concavities and convexities of the fingerprint directly into a binary image. Correction can then be carried out on the gray scale image of the fingerprint according to smoothing and using the direction of the ridges. End points, branch points and points of intersection are present as characteristic points that show the distinctive features of a fingerprint. The characteristic points of the gray scale image of a digitalized fingerprint can be detected by binarizing a fingerprint image, further thinning it and then detecting whether a pattern identical to the pattern of a region of pixels showing a characteristic point is present in the thinned image (for example, Sasagawa et al., "Personal Verification System with High Tolerance of Poor Quality Fingerprints", IEICE Journal, Vol. J72-D-II, No. 5, pp. 707–714 (1989)).

In a fingerprint comparison, the fingerprint for which information has been recorded in memory prior to the time of comparison is called a "registered fingerprint". The fingerprint which is compared for similarity to the registered fingerprint is called a "tested fingerprint". Known methods for comparing a registered fingerprint to a tested fingerprint includes: a method of utilizing the characteristic points of the fingerprint, a method of utilizing the direction of the ridges, and a method of matching the patterns of the original images of the tested fingerprint to that of the registered fingerprint. Japanese Patent Application, First Publication, Laid Open No. Sho 63-132386 discloses a comparison method relying on the superimposition of a thinned image of the tested fingerprint and a thinned image of the registered fingerprint as a method of pattern matching of thinned images.

Smoothing, a treatment for decreasing the noise of a fingerprint image, is, for example, recorded in "Handbook of Image Analysis", pp. 538–548, Tokyo University Publishing (1991), Takagi and Shimoda (Eds.), in which there is a local summation averaging filter which uses the values of neighboring pixels of each pixel.

In the thinning process of a binary image, for those pixels which constitute a line, a majority (majority means from more than half to all, ideally all) of the line widths are set to a width of one pixel. Each pixel of each line may be either black or white. In the description which follows however, the case where each pixel of each line is black will be described. Hilditch's thinning method, in which the outer black pixels in a black pixel aggregation are sequentially deleted while the connectivity between black pixels is maintained, is available, among others, as a method of binarizing a gray scale image and carrying out thinning on that binary image. (See, example, "Introduction to Computer Image Processing", Tamura (Ed.), Soken-Shuppan, pp. 80–83 (1985); Tamura, "Research Related to Multi-sided Image Processing and Its Software", Electrotechnical Laboratory in Japan (ETL), Research Report, pp. 25–64, No. 835 (February, 1984); and Mori et al., "Fundamentals of Image Recognition [I]", pp. 65–71, Ohm Corporation (1986)). In Kobayashi, "A Thinning Method for Extracting Characteristic Points from an Image", IEICE (Institute of Electronics, Information and Communication Engineers of Japan) Technical Report, PRU 90-149, pp. 33–38 (1991), a method of thinning a gray scale image or a binary image is disclosed. As for connectivity between black pixels, either 4-neighbor connected or 8-neighbor connected is used. Four-neighbor connected and 8-neighbor connected are also called 4-connected and 8-connected (e.g., "Introduction to Computer Image Processing", Tamura (Ed.), Soken-Shuppan, pp. 70, (1985)).

A method of creating a binary image by binarizing a light/dark image is disclosed among others, for example, in Mori et al., "Fundamentals of Image Recognition [I]", pp. 65–71, Ohm Corporation (1986).

In the input of a fingerprint, because errors in recognition (rotation and/or parallel displacement) of the tested fingerprint and the registered fingerprint occur, it is necessary to carry out positioning of both fingerprints when performing a comparison between a tested fingerprint and a registered fingerprint. As a method of position matching (rotation, vertical and horizontal displacements), a method utilizing the ridge direction, a method according to representative characteristic points and neighboring characteristic points, and a method of trial and error of displacing in parallel only the movable area are known as methods to position set the image so that the greatest degree of concordance is achieved.

A conventional method for performing the coordinate transformation and the geometric transformation necessary when carrying out position matching is disclosed in, for example, Plastock et al., translated by Koriyama, "Theory and Problems of Computer Graphics", pp. 84–88, McGraw Hill Inc. (1987).

In the position matching during an image comparison, it is useful to obtain the approximate center point of the fingerprint image. Japanese Patent Application, Second Publication, Laid Open No. Sho 58-55548 "A Method for Determining the Center Position of a Figure" discloses a method in which the ridges having gradients of sudden increase are investigated one by one, to obtain the center point. In Ito et al., "An Algorithm for Classification of Fingerprints Based on the Core", IEICE Technical Report, PRU 89-79, pp. 15–22 (1989) a method is disclosed of utilizing the parallel lines of each rectangular area and the number of intersections to approach the center points one by one. In "An Extraction Technique of the Pivot Location for Automated Fingerprint Identification Process", IEICE National Conference on Information and Systems, No. 125, (1987), the number of ridges passing through each scanning line is calculated and the distribution of the number of lines is obtained.

Kobayashi, "A Template Matching Scheme for Fingerprint Image Recognition", IEICE Technical Report, PRU 91-45 and the IEICE Journal, pp. 25–30 (July, 1991), show a method according to the template matching of the black pixels obtained from the thinned line image of a registered fingerprint (or an image on which narrowization has been performed) to the binary image (or an image on which narrowization has been performed). In this method, the quantity of processing and the quantity of memory are decreased more than in a method carrying out template matching utilizing binary images. Narrowization means to reduce the line width of an image. Thinning means to reduce the line width of an image to 1 pixel. Thinning is a special case of narrowization.

In the memory conservation of registered information, it is necessary to make the quantity of memory as small as possible. In the present invention, it is necessary to memory store as registered information a binary image which has undergone narrowization processing. As a method of memory storing line figures, Freeman's method according to chain symbols (i.e., Yasuiin and Nakajima, "Image Information Processing", pp. 113–114, Morikita Publishing (1991)) is known. However, the application of this method to a case where the image is a complicated one, as in the case of a fingerprint image, is difficult.

SUMMARY OF THE INVENTION

It is accordingly a general object of the present invention to reduce the throughput of the recording and the comparison of a fingerprint image. An improvement in the accuracy of the comparison, a reduction in the quantity of registered information, etc. have also been taken into account. Previously, in a fingerprint comparison, a large proportion of processing was occupied with the recovery of the fingerprint lines, thinning and with the position matching of the comparison.

In a method whereby the characteristic points of an image (end points, branch points and points of intersection) are compared, the quantity of processing required for fingerprint line recovery is large, and, in the event that the characteristic points are not clearly defined or are not many in number, carrying out a comparison becomes difficult. In a comparison method by pattern matching the original images of a registered fingerprint and a tested fingerprint, incorrect discrimination can easily occur due to an alteration of the width of the ridges of the fingerprint because of finger pressure, the condition of the dryness of the skin of the finger and the like, at the time when the fingerprint impression is made. Further, the memory quantity required for storage of registered information becomes large.

(1) To avoid reducing the accuracy of the comparison to the variations of the fingerprint lines when the fingerprint impression is made, a method has been resolved wherein the line width of the registered fingerprint is narrowed more than the line width of the tested fingerprint.

(2) Reduction of the throughput of the recovery of the fingerprint lines is solved by a comparison means which does not utilize characteristic points.

(3) Reduction of the throughput of recording and comparison is solved by the selective utilization of the input of an activated fingerprint image, the judging of the fingerprint boundaries and the processing of only the activated division, and, additionally, in the comparison, by midway abandonment, midway decision, multi-step variation of the increment, introduction of a sub-template jump search, and/or mismatch ratio.

(4) Reduction of the amount of processing required for registration and Comparison is resolved by setting the black pixel address of the narrowed image of the registered fingerprint to recorded information as a sub-template and a non sub-template, by creating a storage form which takes into consideration the narrowed image by means of the storage of registered information, and by carrying out the reduction of registered data.

(5) Narrowization processing (including thinning) was resolved by the direct detection of the center point of a black pixel aggregation, and by a preformed criteria table.

BRIEF DESCRIPTION OF THE DRAWINGS

FIG. 3a, 3b, and 3c shows examples of pixel aggregations;

FIG. 5 is an example of a table showing the activated sub-divisions of a fingerprint;

FIG. 10(a) is an unresolved pixel aggregation and the surrounding black pixel line, FIG. 10(b) shows the thinned image after thinning has been accomplished for the unresolved pixels of FIG. 10(a);

FIG. 12 is an example of the table for storing the thinning decision data for unresolved pixels;

DETAILED DESCRIPTION OF THE PREFERRED EMBODIMENTS

Figure 1:
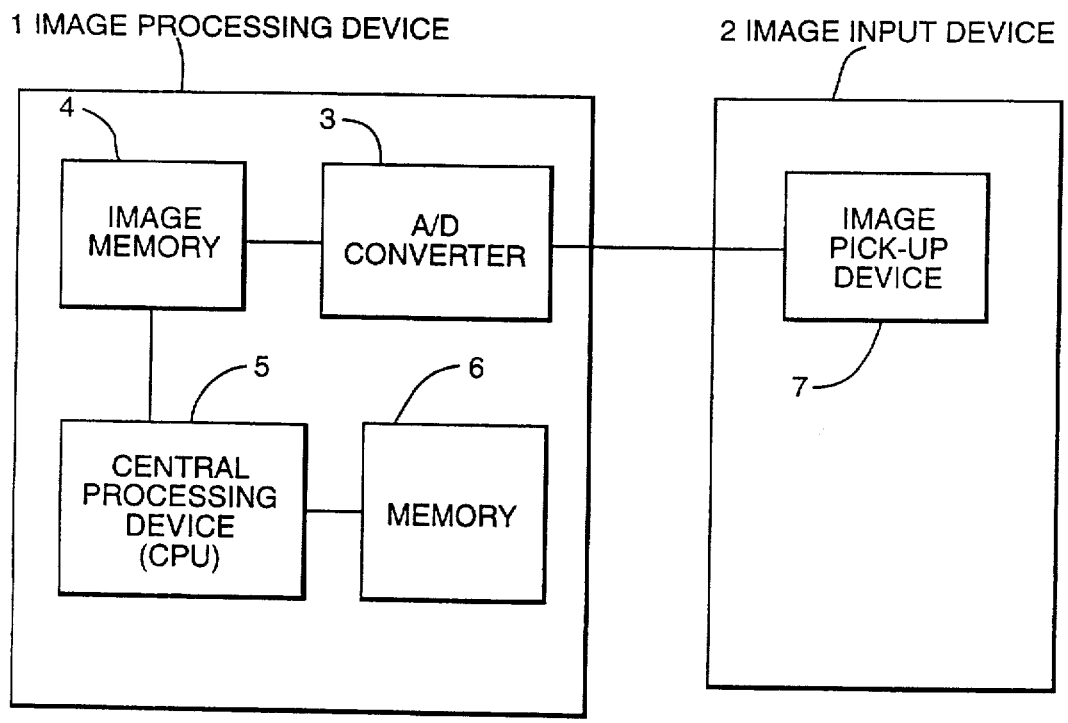
FIG. 1 is a schematic diagram of a fingerprint recognition system related to the first embodiment of the present invention.

As an example of the preferred embodiment of the present invention, the case where the image is a fingerprint (sometimes called a fingerprint image) will be described below. FIG. 1 is an example of a fingerprint recognition system. A fingerprint, which has been input from an image input device 2, is processed at an image processing device 1 (i.e. an image processing apparatus). Image processing device 1 is provided with an image memory 4 for storing, when necessary, the gray scale image of a fingerprint, the binary image and the image on which a variety of processing steps have been performed. Image processing device 1 is further provided with a central processing device 5 having one or more central processing units (CPU), and memory 6 for storing such information as programs, data, and files (data collection). In the case where memory devices having differing characteristics (for example, half conductor memory and magnetic disc) are included in memory 6, the transport of information between the mutual space of these can be carried out by means of hardware or software as necessity demands. Image memory 4 and memory 6 are classifications according to the stored information and can be realized through utilization of the same memory device. Image input device 2 is provided with an image pick-up device 7. A/D converter 3 converts analog information into digital information (here, in the case where using an image input device of the type in which the digital image is directly obtained, an A/D converter is not necessary). Each pixel address in image memory 4, where the fingerprint image which is the gray scale image of a digitalized fingerprint is stored, is shown by the X and Y coordinates (X,Y). Pixel address (X,Y) is sometimes indicated as "pixel (X,Y)", or simply "(X,Y)". The section of image memory 4 which stores a single image is called the image plane. Image memory 4 can hold one or more image planes.

Each image plane of image memory 4 is formed of pixels. When the domains of all of the pixel addresses are set to 0≦X≦Xh, 0≦Y≦Yh, the processing domain which is specified within the domain of this pixel address is processed. In the case where a number with a decimal is generated for the pixel addresses or the number of pixels because of calculations which include the number of pixels and the pixel addresses, processing is carried out by either rounding these numbers up or down. The value of the pixel value is shown by the degree of brightness. Which section of the brightness becomes a ridge depends upon the processing Of the image in image processing device 1, and upon the method of processing of image input device 2. In both cases, processing is possible by presetting in image processing device 1 the brightness characteristics corresponding to the ridges. The aggregation of one or more pixels is called a "pixel aggregation". In fingerprint recognition, the fingerprint which is input from image input device 2 for entry in memory 6 of image processing device 1 is called the "registered fingerprint", and the fingerprint which is input from image input device 2 for testing is called the "tested fingerprint". In an image which is binarized into black and white pixels, either the black pixels or the white pixels may be selected as the preferred pixel to comprise the lines of the fingerprint (either of these may be made to correspond to ridges or valley lines).

In the preferred embodiments of the present invention, black pixels will be treated as the fingerprint lines. Thinning is the process through which a majority of the line widths are set to the width of one pixel. However, in the preferred embodiments of the present invention, the narrowing of some or all of the line widths of a black pixel aggregation so that they are included in an image formed by the black pixels of the original binary image will be called "narrowization processing". Accordingly, in the preferred embodiments of the present invention, thinning is one type of narrowization processing. Additionally, line width is defined as the shortest distance (number of pixels) required to travel from an optional point set at one edge of a line to a point at the other edge of the same line, this distance being traveled by crossing through the inner portion of the line. Line width can be set for each position of the edge of a line.

Figure 2:
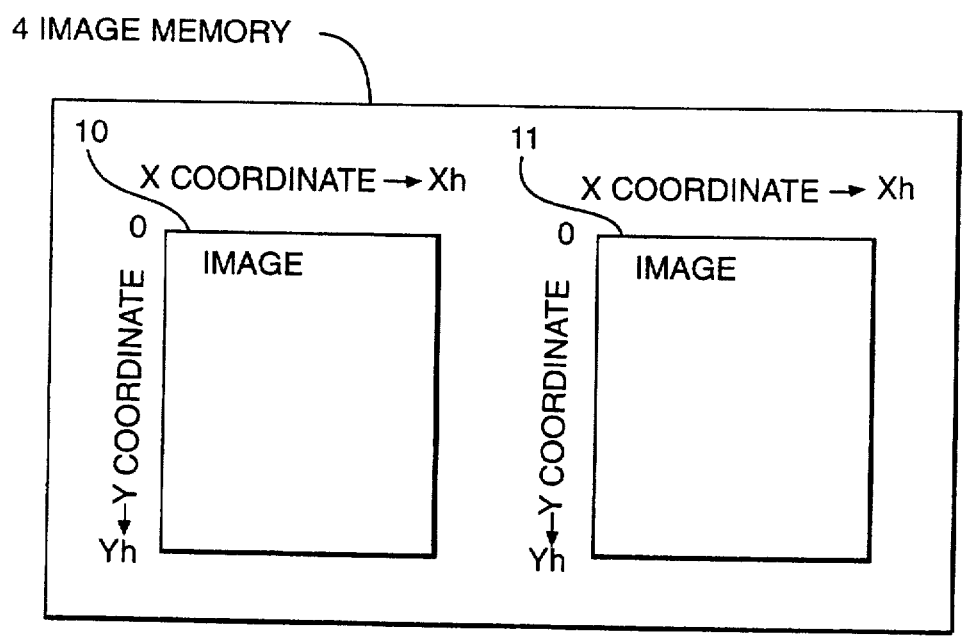
FIG. 2a and 2b is an explanatory drawing of the method of utilization of image memory and memory.
Figure 2:
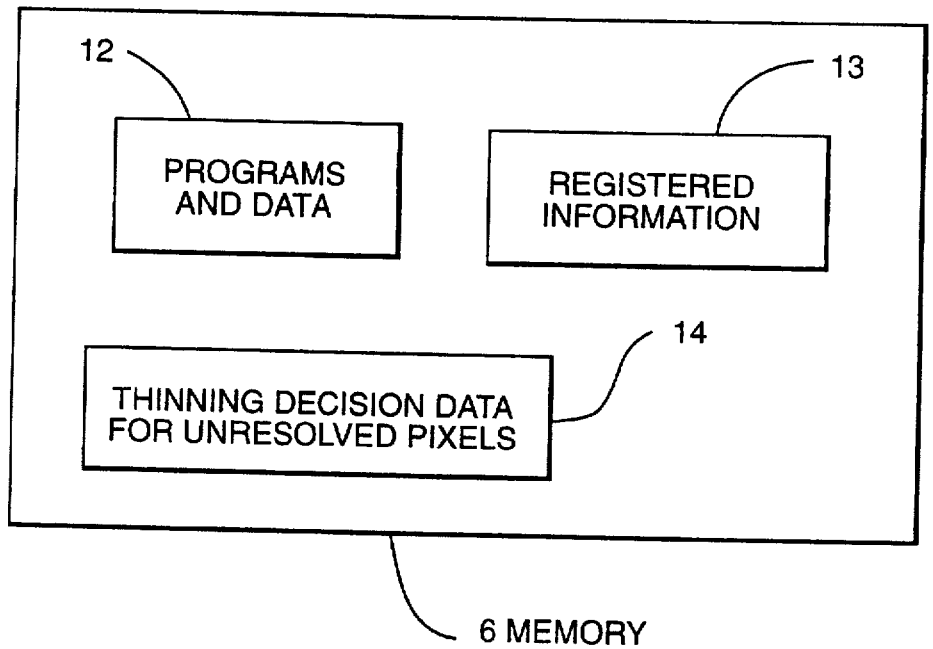

FIG. 2(a) shows the condition of the image data which is snored in image memory 4. The digitalized image (binarized image or gray scale image) obtained from the image which was input from image input device 2 is stored in the image plane of image 10. In the image plane of image 11, past images, for example, are stored and can be utilized in the processing of image 10. Depending on the selection of the processing steps, image 11 may be unnecessary. In this case, memory 4 may utilize only image 10. FIG. 2(b) shows the state of the information stored in memory 6. Program and data for realization of the preferred embodiments of the present invention are stored in program and data 12, while, in registered information 13, recorded information for the registered fingerprint image is stored in a file and maintained.

When the image is a gray scale image, a symbol value corresponding to the degree of brightness is fixed. Depending on the method of image input, a gray scale image established by image memory 4 may be binarized and obtained, or a binarized image may be directly established by image memory 4. A binarized image is shown by means of black and white pixels only. The symbols corresponding to the respective degree of brightness values of the black and white pixels (for example, black pixel=1 and white pixel=0) are set. Whether the black pixels are assigned to sections having a high degree of brightness or to sections having a low degree of brightness is determined by the image desired, and by the method of input of that image. Correspondence to either case is possible. The coordinate axis and the logical origin point of the image stored in image memory 4 may be fixed independently as a position of a pixel of physical image memory 4. While the X axis and the Y axis may be freely set, for the convenience of explanation, the direction of the X axis is from left to right in the horizontal direction (i.e., in the direction of the increasing value of X), and that of the Y axis is from up to down in the vertical direction (i.e., in the direction of the increasing value of Y).

An aggregation of pixels will be called a "pixel aggregation". FIG. 3(a) is an example of a pixel aggregation in which the pixels are arranged in a 3×3 matrix (i.e., 3 pixels×3 pixels). FIG. 3(b) is an example of a pixel aggregation in which the pixels are arranged in a 4×4 matrix. FIG. 3(c) is an example of a pixel aggregation in which the pixels are arranged in a 4×3 matrix.

Notations and definitions are shown as follows. Some of these notations, however, will not appear in the following explanation.

[m]: Indicates the rounding down below the decimal point of an optional number m ∥: Indicates concatenation of two values. For example, 2∥3∥4=234 f(X,Y): Degree of brightness in pixel address (X,Y)

FA: Fingerprint Area; because the fingerprint area can be expressed by using only the fingerprint boundaries, the fingerprint area is stored in memory 6 as fingerprint boundary information. The fingerprint boundary will be treated as the internal area of the fingerprint.

$(X_C, Y_C)$: The address of the approximate center of the fingerprint $(X_{RC}, Y_{RC})$: The address of the approximate center of the registered fingerprint $(X_{TC}, Y_{TC})$: The address of the approximate center of the tested fingerprint Rth: The modified image of a registered fingerprint (i.e., the first modified image) which was obtained by carrying out at least narrowization processing on the binary image of the registered fingerprint (primary image) obtained from the original image of the registered fingerprint (gray scale image or binary image).

Tth: The modified image of a tested fingerprint (i.e., second modified image) which was obtained by carrying out at least narrowization processing on the binary image of the registered fingerprint obtained from the original image of the tested fingerprint (gray scale image or binary image).

RA: The aggregation of all of addresses (X,Y) of the black pixels within the fingerprint area which is in modified image Rth of the registered fingerprint; RA is the sum-set of RT(0), RB(0) and the area of the fingerprint not utilized.

RT(0): RT(0) is a sub-set of RA; RT(0) designates the area of the pixel aggregation in which one or more optional numbers are segregated as the smallest area of RA; RT(0) will be called the "sub-template"; The portion of the image which samples the sub-template is sometimes called the "sub-template portion". The sub-template is used for position matching of the image. (refer to FIG. 3)

RB(0): The aggregation of the portion of the black pixel address which excludes RT(0) from RA. RB(0) is a subclass of RA and designates the area of the pixel aggregation which has segregated one or more optional numbers. RB(0) will be called the "non sub-template". The portion of the image which samples the non sub-template is sometimes called the non sub-template portion. The non sub-template is not used for position matching of the image. (refer to FIG. 3)

RT(S): The aggregation of black pixel addresses (X,Y) of the sub-template RT when the coordinate axis of the modified image of the registered fingerprint is rotated S degree about a point which is optionally set as center.

RT(S, H, V) : The aggregation of the addresses of sub-template RT(0) in the coordinate axes following the rotation S° of the coordinate axes of the modified image of a registered fingerprint about an optional point (i.e., the approximate center point of the registered fingerprint), and after carrying out horizontal displacement H, and vertical displacement V; RT(0,0,0)=RT(0) and RT(S,0,0)=RT (S); (A single pattern which is translated through coordinate conversion of the modified image of a registered fingerprint is set according to the value of the set S, H, and V, which designates the position of translation).

RB(S, H, V) : The aggregation of the addresses of non sub-template RB(0) in the coordinate axes following the rotation S of the coordinate axes of the modified image of the registered fingerprint image about an optional center point (for example, the approximate center point of the registered fingerprint), and after carrying out horizontal displacement H, and vertical displacement V; RB (0,0,0)=RB(0) and RB (S,0,0)=RB (S).

N1m: The number of the concordant black pixels of the sub-template; indicates the number of black pixels which are concordant between the sub-template of the registered fingerprint and the sub-template of the tested fingerprint.

N1c: The total number of black pixels in the sub-template; indicates the total number of black pixels in the sub-template of the registered fingerprint.

N2m: The number of concordant black pixels in the non sub-templates; indicates the number of black pixels which are concordant between the non sub-template of the registered fingerprint and the non sub-template of the tested fingerprint.

N2c: The total number of black pixels of the non sub-template; indicates the total number of black pixels in the non sub-template of the registered fingerprint.

Nm: Indicates N1m or N2m; Counter Nm is the value of the counter for calculating Nm (the case where Nm=N1m+N2m also exists).

Nc: Indicates N1c or N2c. Counter Nc is the value of the counter for calculating Nc (the case where Nc=N1c+N2c also exists).

Figure 4:
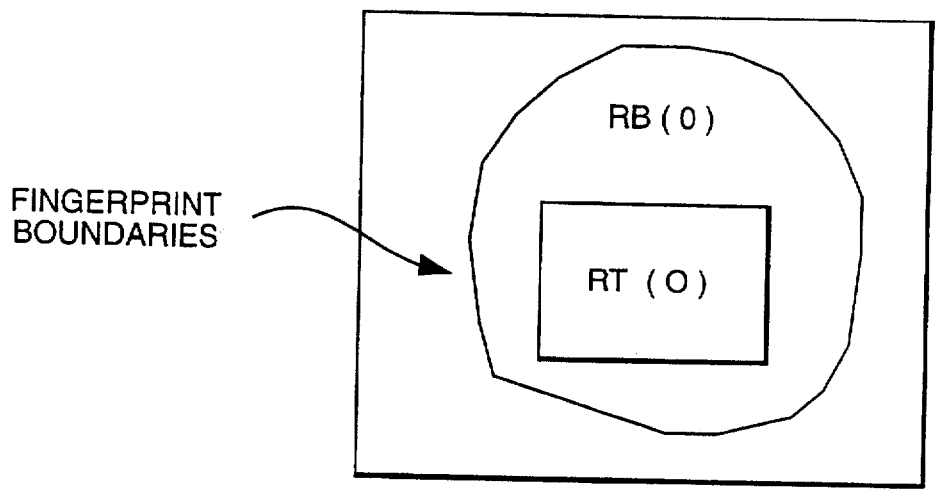
FIG. 4a through 4d shows examples of sub-template/non sub-template classification for a fingerprint area.
Figure 4:
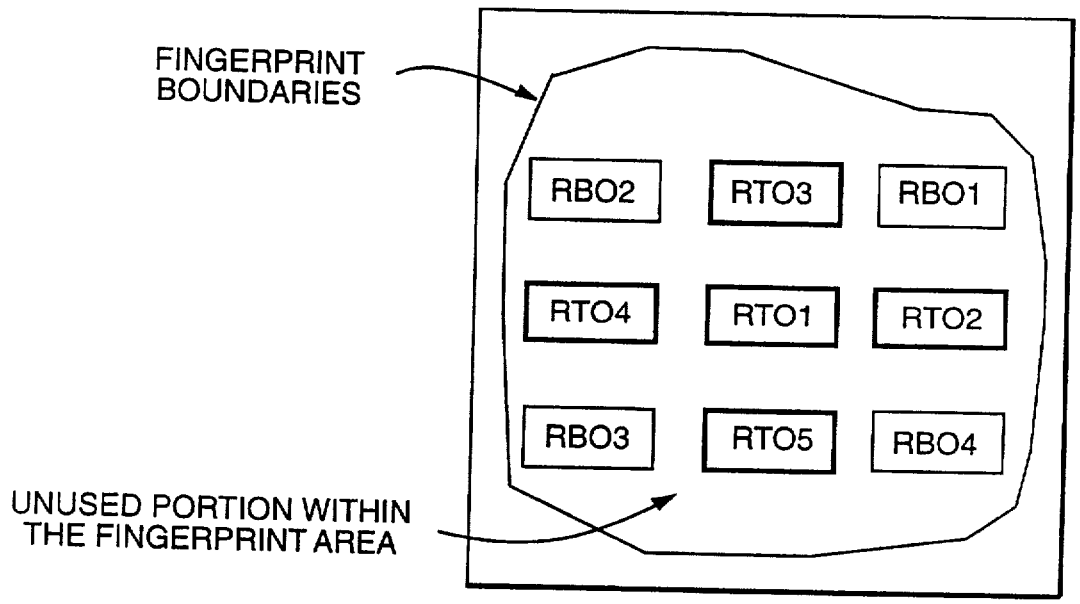
Figure 4:
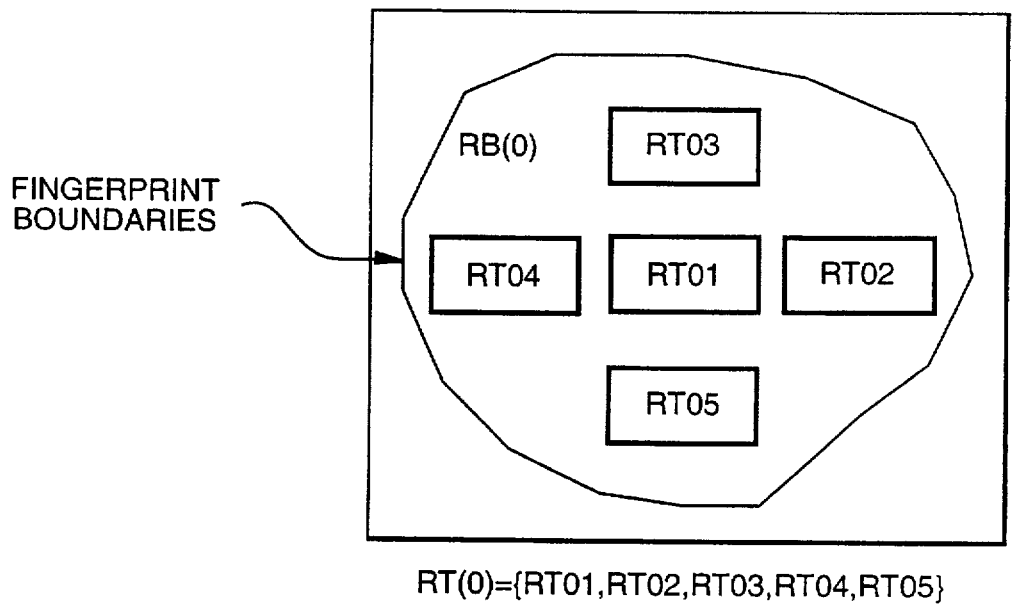
Figure 4:
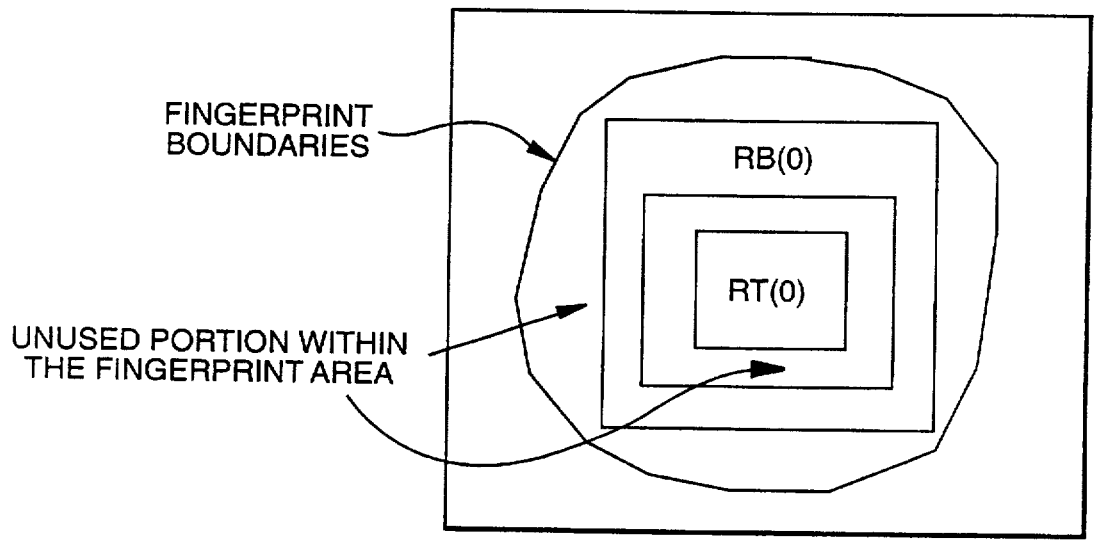

FIG. 4 shows an example of the relationship of the fingerprint area determined by fingerprint boundaries, to the portion which samples sub-template RT(0), and to the portion which samples non sub-template RB(0), in image 10 in image memory 4. Examples 1–4 are examples of the sub-template portion and the non sub-template portion.

The means for carrying out the processing of a fingerprint image will be described below. Additionally, in the steps of the procedures, when the subsequent processing is not recorded, the step immediately following is proceeded to. Taking into consideration the variety of conditions of image processing device 1 and image input device 2, the predetermined number utilized in each means is set statically or dynamically to an appropriate value. The realization of each step may be varied provided that the contents of processing are identical.

I. Smoothing Processing Means

Smoothing is the process of decreasing the noise of a fingerprint image. Smoothing processing can be carried out through utilization of a conventional method. (For example, a local summation averaging filter or the like, which utilizes the value of the neighboring pixel of each pixel, may be used).

In the case where a binary image can be input directly to image memory 4, smoothing can be omitted. When a binary image is smoothed, because the image becomes a gray scale image, it is necessary to carry out binarization once again.

II. Binarization and Background Segregation Means

Binarization is the process of changing a gray scale image into a binary image. Background segregation is the process of clarification of the activated area of the fingerprint image of image 10 in image memory 4. An example of a procedure for carrying out binarization and background segregation is given in procedure B below. The input information of procedure B is the input information of the image. The output information of procedure B is the binary image of the output image and the boundary information of the fingerprint. When an image input device of a type which can directly input a binary image to image memory 4 is utilized, binarization is omitted (step B1), and only background segregation is carried out. In the event that background segregation by binarization is unnecessary, execution of step B1 only is permissible.

(Procedure B) K is defined as a predetermined number indicating the length in the direction of X of the sub-division (equal to the length in the direction of Y of the sub-division area). And, $$L=(X_h+1)/K$$

Here, K is selected so that L is an integer (in general, it is possible to vary the length of each sub-division). And, $$K_{max}=((X_h+1)/K)-1$$

For image 10, the sub-division addresses for uniquely and clearly discriminating between sub-divisions are defined as an initial pixel address for each sub-division. Optional pixel address (X,Y), at sub-division address J(M,N), is $M=[X/K]$, and $N=[Y/K]$. Accordingly, pixel address (X,Y) corresponding to sub-division address J(M,N) is obtained by, $$X=K \cdot M, (M=0,1,2,\ldots,K_{max})$$

$$Y=K \cdot N, (N=0,1,2,\ldots,K_{max})$$

Step B1 (binarization):
For $$M=0,1,2,\ldots K_{max}$$

$$N=0,1,2,\ldots K_{max}$$

the following processing is carried out. The average brightness Bav(M,N) of all of the pixels within each sub-division is obtained for each sub-division J(M,N) from $$Bav(M,N) = \text{(the sum of the brightness of the pixels within the sub-division)/(the number of pixels within the sub-division)}$$

Next, (M,N) in $$X=K \cdot M(M=0-K_{max})$$

$$Y=K \cdot N(N=0-K_{max})$$

is made the limit of image 10. In other words, when the limits of the image are $$0 \leq X \leq X_h$$

$$0 \leq Y \leq Y_h$$

the limits become $$M=0-[X_h/K]$$

$$N=0-[Y_h/K]$$

and, $$\text{total number of sub-divisions in image 10} = ([X_h/K] + 1) \cdot ([Y_h/K] + 1)$$

For each sub-division, for the degree of brightness f(X,Y) of pixel (X,Y) of the sub-division for which Bav(X,Y) was obtained, the threshold value T of the binarization is set to $$T = \text{average value of brightness of sub-division} + D$$
(where D is a constant (positive, negative or zero) predetermined number)

When $f(X,Y) \geq T$, (X,Y) for this sub-division (M,N), i.e., the (X,Y) of the region of $$K \cdot M \leq X \leq K \cdot (M+1)-1$$

$$K \cdot N \leq Y \leq K \cdot (N+1)-1$$

is set to white pixels (however, when reversing the pixels, (X,Y) is set to black pixels), while when $f(X,Y)<T$, the (X,Y) is set to black pixels (however, when reversing the pixels, (X,Y) is set to white pixels).

At this point, $B_L$ and $B_H$ are set as the constants for classifying activated and non activated sub-divisions.

Step B2 (rendering a judgement of "activated" to a sub-division)

The average value of the degree of brightness of the sub-division is again obtained for the binary image resulting from step B1. Next, for sub-division address $I_{MN}=([X/K], [Y/K])$ (The sub-division address is the initial address of each sub-division)

$$X=K \cdot M, (M=0,1,2,\ldots K_{max})$$

$$Y=K \cdot N, (N=0,1,2,\ldots K_{max})$$

a judgement of "activated/non-activated" is rendered for each sub-division according to the average value of the degree of brightness $B_{av}(X,Y)$ obtained from the function of the average value of the degree of brightness for each sub-division. In other words, in a sub-division where $B_L \leq B_{av}(X,Y) < B_H$, that sub-division is judged to be an activated sub-division and is so set to the activated sub-division table G(M,N).

$$G(M,N) = \begin{cases} 1: \text{activated sub-division} \\ 0: \text{non-activated sub-division} \end{cases}$$

The non-activated sub-division of image 10 is set to white pixels.

Step B3 (Inspection of the number of activated sub-divisions) From G(M,N),

YT=number of activated sub-divisions is counted. When YT≧YC (YC is a constant number), step B4 is proceeded to. When YT<YC, due to a shortage error in the number of activated sub-divisions, the present procedure undergoes an error return.

Step B4 (left margin of the fingerprint boundary of a sub-division unit):

The information of the fingerprint boundaries of a sub-division is shown by {(NT, ML, MR), NT=0–Kmax}. For each N=NT value, ML≦M≦MR is the fingerprint area of the sub-division unit.

The left margin of the fingerprint boundary is obtained for the sub-division unit. Starting from N=0, the following process is carried out for N=NT, (NT=0~Kmax). Beginning from the left margin (M=0) and continuing in the increasing direction of M, those elements G(M,N) having an indicator of "1" (indicating an activated sub-division) in table G, which shows the activated sub-divisions, are searched for sequentially. The value ML of the initial M of a section in which indicators having a "1" value are continuous for KC (KC is a predetermined number greater than 1 and used for judging the fingerprint boundaries of the sub-division) indicators or more is set as the left margin of the fingerprint area for the current N. At M=0~Kmax, when indicators having a value of "1" (indicating an activated sub-division) are not found to be continuous for KC indicators or more, the value of the current N is the non fingerprint area for all M and, at NT of the non fingerprint area, $$M_L = M_R = -1$$

Step B5 (right margin of the fingerprint boundary for each sub-division):

Here, the right margin MR of the fingerprint boundary is obtained for each sub-division unit. Starting from N=0, for N=NT (NT=0~Kmax), any N for which the left margin was not set in step B4 (i.e., the N when ML=−1) is skipped. Beginning from the left margin (M=Kmax) and continuing in the decreasing direction of M, those elements G(M,N) which are indicated by "1" (indicating an activated sub-division), are searched for sequentially. The value MR of the initial M of a section in which indicators having a value of "1" are continuous for KC (KC is a predetermined number) or more indicators is set as the left margin of the fingerprint area for the current N. From the preceding, information ((NT, ML, MR), NT=0~Kmax) on the fingerprint boundaries of the sub-division is obtained.

Step B6 (fingerprint boundary information of each pixel)

The fingerprint boundary information of each pixel is obtained from the fingerprint boundary information {(NT, ML, MR), NT=0~Kmax} for each sub-division. The fingerprint boundary information of each pixel is shown by {(YT, XL, XR), YT0~(Yh−1)}. For the value of each YT, XL≦X≦XR is the fingerprint area.

According to the fingerprint boundary information of the sub-division, in N=0~Kmax, for Y=YT of K×N≦Y≦K×N+Kmax, $$X_L = K \cdot M_L$$

$$X_R = K \cdot M_R + K_{max}$$

The fingerprint boundary information {(YT, XL, XR), YT=0~(Yh−1)} of each pixel is obtained.
(End of procedure B)

From this point on, for the sake of simplicity, the term "fingerprint boundary information" will indicate the fingerprint boundary information {(YT, XL, XR), YT=0~(Yh−1)} of each pixel. FIG. 5 is an example of a table showing the activated area of a fingerprint.

III. Process for Timing Confirming Input from Image Input Device to Image Memory In order to vary image 10, which was input from image input device 2 to image memory 4, by translating the object in image pick-up device 7, it is necessary to set the timing which confirms image 10 of image memory 4 to obtain a good quality image. For this purpose, the processing includes, (1) a process for notification of the confirmation timing of the image by a signal from image input device 2 to image processing device 1, (2) a process in which the user indicates the confirmation timing of the image to image processing device 1, or (3) a process in which image processing device 1 checks and sets the confirmation timing of the image and the condition of image 10 of image memory 4.

A preferred embodiment of process (3) follows below.

The image input timing is judged according to the activated block rate of a small region of image memory 4. The activated block rate can be obtained in the same manner as steps B1~B3 of procedure B. This procedure is shown in procedure Bs.

In procedure Bs when the ratio of the activated sub-division is below the threshold value, procedure Bs is retested after a set time has elapsed. The input information of procedure Bs is the input image information and the limits of the small window area of image memory 4. The small window area is the limits included in the limits of image 10 which is used in procedure B. Additionally, in order to reduce processing time the processing limits are made smaller than in procedure B. If the processing time is not a consideration, image 10, which is used in procedure B, may be made the object. The output information of procedure B is the confirmation or non-confirmation of image 10.
(Procedure Bs)

K is set to a constant showing the length of the sub-division in the X direction (equal to the length of the sub-division in the Y direction), and $$L = (X_h + 1)/K$$

K is selected here so that L is an integer (in general, the length of the sub-division can be varied for each sub-division), and
ti $K_{max} = \{(X_h+1)/K\} - 1$ For image 10, the sub-division addresses for clearly distinguishing sub-divisions are set to the initial pixel address of each sub-division. Optional pixel address (X,Y), at sub-division address J(M,N), is M=[X/K], and N=[Y/K]. Accordingly, pixel address (X,Y) corresponding to sub-division address J(M,N) is obtained according to, $$X = K \cdot M, (M=0,1,2, \ldots K_{max})$$

$$Y = K \cdot N, (N=0,1,2, \ldots K_{max})$$

(binarization)
For $$M=0,1,2, \ldots K_{max}$$

$$N=0,1,2, \ldots K_{max}$$

the following processing is carried out. The average brightness value Bav(M,N) of all pixels within each sub-division is obtained according to Bav(M,N) = (sum of brightness of the pixels within sub-division)/(number of pixels within sub-division)

for each sub-division J(M,N). Next, for (M,N) in $$X = K \cdot M, (M=0 \sim K_{max})$$

$$Y = K \cdot N, (N=0 \sim K_{max})$$

only the complete small window is processed in the following steps. In other words, when the small window is $$X_s \leq X \leq X_s + X_L - 1$$

$Y_S \leq Y \leq Y_S + Y_L - 1$ the limits are $$M = [X_S/K] \sim [(X_S + X_L - 1)/K]$$

$$N = [Y_S/K] \sim [(Y_S + Y_L - 1)/K]$$

total number of
sub-divisions within $= ([(X_S + X_L - 1)/K] - [X_S/K] + 1) \times$
small window $\quad ([(Y_S + Y_L - 1)/K] - [Y_S/K] + 1)$ For each sub-division, the threshold value T for brightness f(X,Y) of pixel (X,Y) of a sub-division for which Bav(X,Y) was obtained is, T=average brightness value of sub-division+D (D is a constant integer, positive, negative or zero)

For (X,Y) of sub-division (M,N) at this time, i.e., (X,Y) in the limits of $$K \cdot M \leq X \leq K \cdot (M+1) - 1$$

$$K \cdot N \leq Y \leq K \cdot (N+1) - 1$$

when f(X,Y)≧T, (X,Y) is set to white pixels (or black pixels when an indication of a white-black reversal is present).

When f(X,Y)<T, (X,Y) is set to black pixels (or white pixels when an indication of a white-black reversal is present).

Here, BL and BHare constants for classifying activated and non-activated sub-divisions.

Step Bs2 (activated sub-division judgement):

The average brightness value of the sub-division is again obtained for the binary image resulting from step Bs2. Next, for the internal area of the small window within sub-division address $I_{MN} = ([X/K], [Y/K])$ (the sub-division address is the initial address of each sub-division)

$$X = K \cdot M, (M = 0, 1, 2, \ldots K_{max})$$

$$Y = K \cdot N, (N = 0, 1, 2, \ldots K_{max})$$

a judgement of "activated/non-activated" is rendered for each sub-division according to the average brightness value Bav(X,Y) obtained from the f(x) of the average brightness of each sub-division. In other words, when $$B_L \leq B_{av}(X,Y) \leq B_H$$

that sub-division is judged to be "activated" and an indication to this effect is set in activated sub-division table G(M,N).

$$G(M,N) = \begin{cases} 1: \text{activated sub-division} \\ 0: \text{non-activated sub-division} \end{cases}$$

The non-activated sub-divisions within the window are set to white pixels.

Step Bs3 (inspection of the number of activated pixels)

YT=number of activated sub-divisions within the small window is counted according to G(M,N), and when $$YT \geq YCB (YCB \text{ is a constant})$$

the process ends with image input confirmation being possible. When $$YT < YCB$$

the process ends with image input confirmation not being possible.

(End of procedure Bs )

IV. Image Correction Processing

The degree to which it is necessary to carry out image correction is determined by the quality of the image. As necessary, omissions or reinforcements are carried out. For example, it is possible to perform such simple corrections to image 10 as the exclusion of aggregations of isolated black pixels (by changing them to white pixels), filling aggregations of isolated white pixels (by changing them to black pixels), etc. according to the neighboring pixel pattern for each pixel within the fingerprint area of the binary image.

Figure 6:
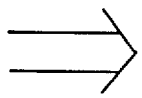
FIG. 6a and 6b is a simple example of image correction.
Figure 6:
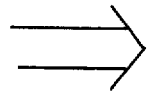

Image correction in the preferred embodiments of the present invention is supplied with the objective of providing an ability to sufficiently carry out narrowization. An example is shown in procedure T of the procedure for carrying out such simple corrections to image 10 as the exclusion of aggregations of isolated black pixels (by changing them to white pixels), the filling-in of aggregations of isolated white pixels (by changing them to black pixels), etc., according to the neighboring pixel pattern for each pixel within the fingerprint area of the binary image. The situation shown applies to the individual processes carried out on a 5×5 pixel aggregation. In general, the identical processing can be performed for a pixel aggregation of n×n (n=2k+1, k=1, 2, ...). It is necessary to appropriately set the size of the pixel aggregation on which image correction is being carried out in response to the pixel number of image memory, the quality of the image, etc. An example of the transformation of black and white pixels after the positions of individual appellations P0–P24 of a 5×5 pixel aggregation centered about an optional pixel P0 and procedure TZ have been applied is shown in FIG. 6(a) and FIG. 6(b). The input information of procedure TZ is the input image information and the information of the fingerprint boundary. Output information is the output image information.

(Procedure TZ)

A pixel focused on in the inner region of the fingerprint (including boundaries) in image 10 is set to P0=(X,Y). The processes of steps T1~T4 are repeated for $$X = 5u + 3, (u = 0, 1, \ldots [(X_b - 3)/5])$$

$$Y = 5v + 3, (v = 0, 1, \ldots [(Y_b - 3)/5])$$

(i.e., here, (X,Y) is selected every 6th pixel) Additionally, because the region outside the fingerprint area has been set to white pixels during binarization, the pixels of a 5×5 pixel aggregation are all either black or white. When processing 5×5 pixel aggregations following selection of P0 within the fingerprint area, it is not necessary to consider the fingerprint area.

Step TZ 1 (P0 selection)

Whether or not pixel P0=(X0, Y0) is within the fingerprint boundary is checked according to fingerprint boundary information (YT, XL, XR). In other words, for XL and XR of YT, which becomes Y0=YT, when XL≦X0≦XR, then P0 is within the boundary of the fingerprint. If XL≦X0XR is not satisfied, then P0 is outside the boundary of the fingerprint. Next, (1) when P0 is within the boundary of the fingerprint, step TZ2 is proceeded to (2) when P0 is outside the boundary of the fingerprint, the next P0 is proceeded to and processing is carried out from step TZ1

Step TZ 2 (removal of an isolated black pixel aggregation):

The removal of aggregations of isolated black pixels is performed in this step.

(1) When $P_9 \sim P_{24}$ are all white pixels, the pixels of $P_0 \sim P_8$ are all set to white and step TZ3 is proceeded to. When this is not the case, (2) is proceeded to. (2) When $P_1 \sim P_8$ are all white pixels, $P_0$ is set to a white pixel and step TZ3 is proceeded to. If this is not the case, step TZ3 is proceeded to without anything being done.

Step TZ 3 (removal of an isolated white pixel aggregation):

In this step the process of filling in an isolated white pixel aggregations (which can be thought of as "holes") is performed.

(1) When $P_9 \sim P_{24}$ are all black pixels, the pixels of $P_0 \sim P_8$ are set to all black pixels and step TZ4 is proceeded to. If this is not the case, (2) is proceeded to.

(2) When $P_1 \sim P_8$ are all black pixels, $P_0$ is set to black pixels and step TZ4 is proceeded to. If this is not the case, step TZ4 is proceeded to without anything being done.

Step TZ 4:

Terminates this procedure (End of procedure TZ)

In procedure TZ, at steps TZ2 and TZ3, when the pixel which is to be updated already is of the value it is to be updated to, updating is not necessary. However, update may be carried out in order to avoid value confirmation processing.

V. Process for Obtaining Approximate Center Point

Additionally, there is a process for regarding the center of image 10 ($[X_h/2]$, $[Y_h/2]$) or a nearby point to be the approximate center point (Xc,Yc) located at the approximate center point of the image.

Figure 7:
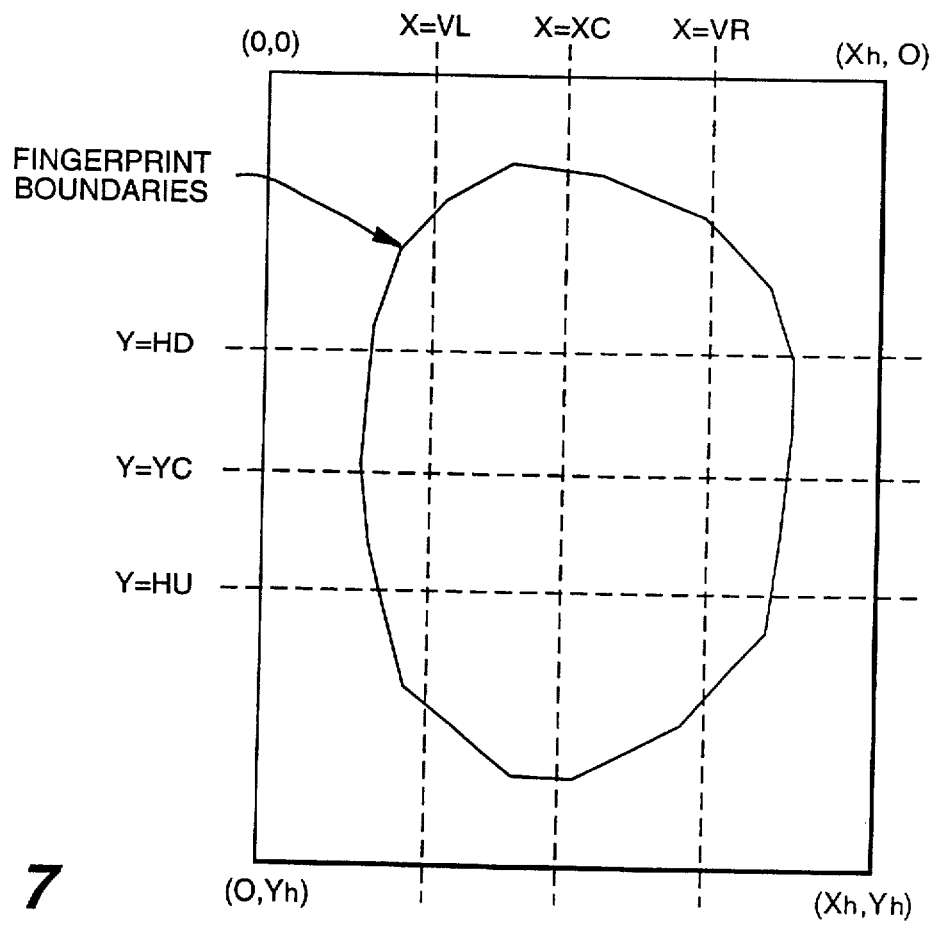
FIG. 7 is an example of an explanatory drawing of the procedure for obtaining the approximate center point of a fingerprint image.

As a separate step, from the binary image of the fingerprint in image 10, a procedure in order to find the approximate center point of the area of the fingerprint is shown below in procedure QZ. The input information of procedure QZ is the input image information and information of the fingerprint boundary. The output information of procedure QZ is the approximate center point (Xc, Yc). Each constant, fingerprint area and function of the approximate center point are shown in FIG. 7.

(procedure QZ)

Step QZ 1 (process for obtaining Yc):

For the limits of $$V_L \leq X \leq V_R$$

parallel line $Y=KA_i$ ($i=1,2,\ldots,n$; $H_D \leq Y \leq H_U$) and line KH$_i$ ($i=1,2,\ldots n$), which intersects with the black pixel line forming the fingerprint line, are obtained. Here, the line segment width of each intersecting section of black pixels is set at or above a fixed value (for example, one pixel). For $H_D$, $H_U$, $V_L$, $V_R$, the limits $V_L \leq X \leq V_R$ and $H_D \leq Y \leq H_U$ are within the fingerprint area and are constant numbers selected so that they become the settable limits of the approximate center point. $KA_i$ ($i=1,2,\ldots,n$) is a constant which sets the scanning position.

Next, for line KH$_i$ ($i=1,2,\ldots n$) intersecting parallel line $Y=KA_i$, i-im, for which KH$_i$ ($i=1,2,\ldots n$) is large, is obtained. In general, there is one or more im (set to Ty). Yc, which is the Y coordinate of the approximate center point, is obtained according to $$Y_C=(\Sigma_{i=im}KA_i)/T_y$$

Here, $\Sigma_{i=im}KA_i$ indicates the sum of $KA_i$ for each i=im.

Step QZ 2 (process for obtaining Xc):

For the limits of $H_D \leq Y \leq H_U$, vertical line $X=KB_i$ ($i=1,2,\ldots n$; $V_L \leq X \leq V_R$) and the number of lines KV$_i$ ($i=1,2,\ldots n$) intersecting with the black pixel line which is the fingerprint line, is obtained. Here, the line segment width of intersecting sections of black pixels is set to a fixed value (for example, one pixel). $KB_i$ ($i=1,2,\ldots,n$) is a constant number.

Next, for the number of lanes KV$_i$ ($i=1,2,\ldots,n$) intersecting with vertical line $X=KB_i$, i=im is obtained in which KV$_i$ ($i=1,2,\ldots n$) is large. In general, there is one or more is (set to Tx). Xc, which is the X coordinate of the approximate center point, is obtained according to $$X_C=(\Sigma_{i=is}KB_i)/T_x$$

Here, $\Sigma_{i=im}KB_i$ indicates the sum of $KB_i$ for each i=is.

Step QZ 3

(Xc,Yc) is set as the approximate center of the fingerprint area.

(End of procedure QZ)

Restrictions are set to the limits for which an approximate center point is obtained for a fingerprint with an unclear center point. The procedure is as follows. The limits of the approximate center point can be set to an optional shape and are set to small limits which can be dealt with by comparison processing. For example, $$X_{CL} \leq X \leq X_{CH},$$

and $$Y_{CL} \leq Y < Y_{CH}$$

can be set as the limits.

When a (Xc,Yc) outside these limits is obtained, the approximate center is set to the value closest to the limits of the approximate center. In other words, when $X_C < X_{CL}$, $X_C = X_{CL}$ is set when $X_C > X_{CH}$, $X_C = X_{CH}$ is set when $Y_C < Y_{CL}$, $Y_C = Y_{CL}$ is set when $Y_C > Y_{CH}$, $Y_C = Y_{CH}$ is set.

VI. Thinning

A digital image is, when binarized, shown by black and white pixels. However, the symbol value which is the value of the respective degrees of brightness of the black and white pixels is preset. Furthermore, in the method according to the present invention, pixels known as "unresolved pixels" (a pixel which has not been distinguished as a black or white pixel) are present. However, the symbol values with respect to these unresolved pixels are also pre-set. Although in this invention, thinning is executed for black pixels, whether the black pixel has a high or low degree of brightness is determined by the image desired, its method of input, the presence or absence of a reversal of brightness, etc. For all of these situations, the section to be thinned will be called a "black pixel", and anything else will be called a "white pixel". FIG.2(a) shows the condition of the image data stored in image memory 4. The gray scale image obtained from information input from input device 2 or a binary image (including the situation where a gray scale image is binarized) is stored in image 10 as the original image. In the connectivity of black pixels of a thinned image, which is the image resulting from thinning the original image 10, either 4-neighbor connected or 8-neighbor connected is used. In the embodiments of the present invention, 8-neighbor connected is used for connectivity of black pixels. An image undergoing the process of thinning and a thinned image (i.e., an image for which thinning has been completed) is stored in image 11 for original image 10. FIG. 2(b) shows the situation of the information which is stored in memory 6.

Program and data for executing the method of the present invention are stored in programs and data 12. Decision data for thinning unresolved pixels are stored in unresolved pixel thinning decision data 14. FIG. 3(a) shows an abbreviation of a 3×3 pixel aggregation centered about pixel P0. For each pixel address, the address of P0 is set to (X,Y), and the address of P1 is (X+1,Y), of P2 is (X+1,Y−1), of P3 is (X,Y−1), of P4 is (X−1,Y−1), of P5 is (X−1,Y), of P6 is (X−1,Y+1), of P7 is (X,Y+1), and of P8 (X+1,Y+1).

A preferred embodiment is given below of the situation where the X axis and lines parallel to it are used as one straight line Lx and its parallel lines, and where the Y axis and lines parallel to it are used as straight line Ly, which rotates only a set angle above 0 degrees of straight line Lx, and as the lines parallel to Ly (i.e., the turning angle is 90 degrees). Additionally, each parallel line must be only a line passing through each coordinate.

An example of the step which, in a binary image, classifies black pixels and white pixels which have undergone thinning processing, from unresolved pixels—pixels for which thinning is unresolved—is shown in procedure A. An abbreviation of procedure A is shown is FIG. 8.

[Procedure A)

Step A1:

In this step, each black pixel of the X axis and lines parallel to the X axis is classified as a black pixel, a white pixel or an unresolved pixel. For original image 10 which is the binary image stored in image memory 4, Y=Y0 (Y0=0, 1,2, ... Yh) is set. The connective region of black pixels at this point in time is set to $X_{Li} \leq X \leq X_{Hi}$ (i=1,2,...). Because nothing is as of yet set in image 11 for the thinned image, original image 10 is duplicated to image 11. Next, for the entire direction of X, (1) when a set value W is not satisfied, only the center point (the pixel in the decreasing direction of the X coordinate when the number of pixels of said interval is odd) of the division connected to the black pixel (i.e., the coordinates (X,Y0) and the interval $X_{Li} \leq X \leq X_{Hi}$ for an i which satisfies $X_{Hi} - X_{Li} + 1 < W$) is set as a black pixel for the division connecting to the black pixel of (W≧2). Other pixels are set to white; and (2) all pixels in a division connected to a black pixel having a value above set value W are set as unresolved pixels.

The above results are set to image 11.

Y0 is increased by 1 and the processing of this step is carried out for all Y0.

Step A2

In this step the connectivity of the coordinates {set to coordinate (X0,Y0)} of the pixel which is set as a black pixel and the connectivity of the black pixel of the X axis and lines parallel to the X axis for Y=Y0−1 where Y is the Y coordinate of the pixel immediately preceding the first black pixel is checked for image 11 (original image 10 is also referred to). Processing for connectivity is carried out as necessary. In other words, for the domain 0≦−Y0≦Yh, in order to connect a black pixel or an unresolved pixel of Y=Y0 which is currently being processed, to the black pixel or the unresolved pixel of Y=Y0−1, the coordinate of the black pixel and the unresolved pixel is set to (X0,Y0) and the following process is carried out.

(1) If one or more of the coordinates of (X0−1, Y0−1), (X0, Y0−1) or (X0+1, Y0−1) is a black pixel or an unresolved pixel, since it is connected to (X0,Y0), the processing of this step ends. Or, (2) when there are no black pixels or unresolved pixels in the coordinates of (X0−1,Y0−1), (X0,Yc−1) and (X0+ 1,Y0−1), (X0−2,Y0−1) is checked as to whether or not it is a black pixel or an unresolved pixel. When it is a black pixel or an unresolved pixel, and (X0−1,Y0) is set as a black pixel to connect (X0−2,Y0−1) with (X0,Y0). Additionally, similar processing is carried out for (X0+ 2, Y0−1). Following this, similar processing is carried out on (X0+R, Y0−1), (X0+R, Y0−1). Checking is conducted up to (X0+R, Y0−1), and when no black or unresolved pixels are discovered, conditions are set as is. Connectivity search region R is a pre-set parameter. Next, step A2 is repeated for all of (X0,Y0) under examination.

Figure 9:
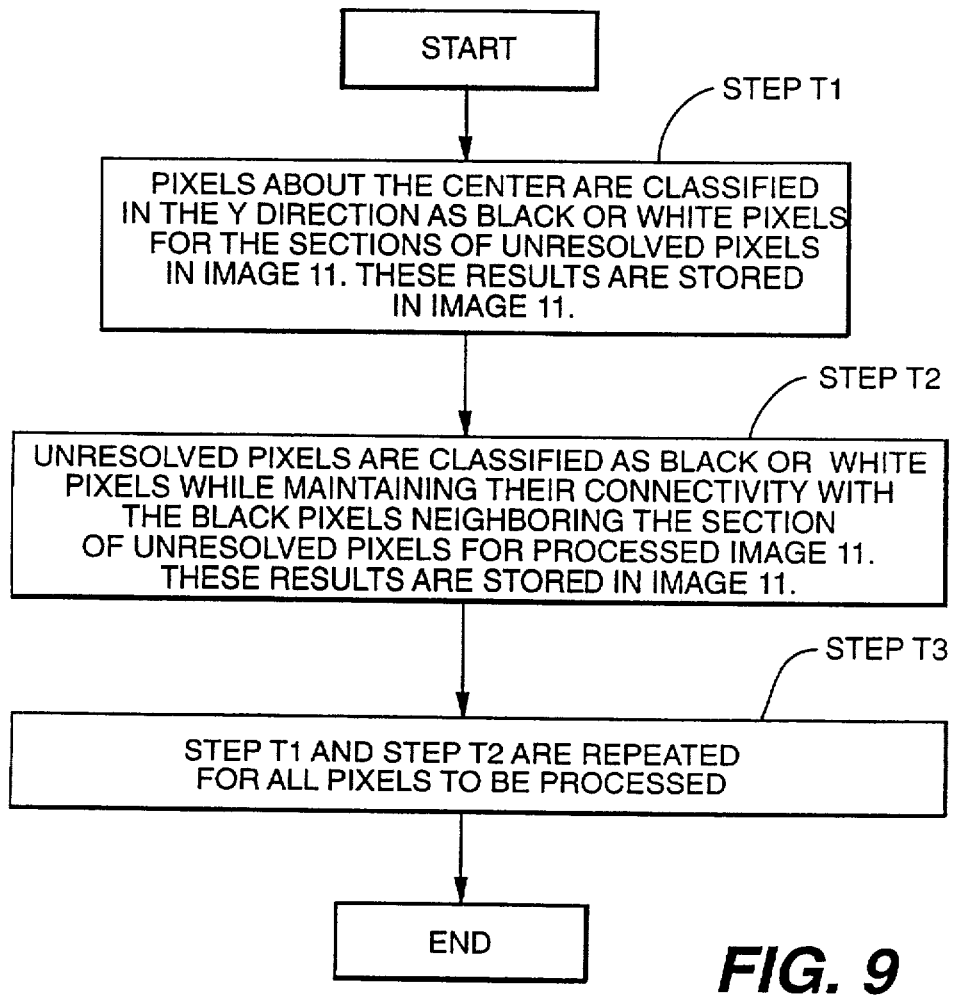
FIG. 9 is an abbreviation of the partial process of the thinning of unresolved pixels (i.e., procedure T)

Next, an unresolved pixel generated by the results of execution of procedure A (in the case of a gray scale image, the results of execution of procedure BZ), and an example of the step of thinning for the Y axis and lines parallel to it is shown. In step T, for unresolved pixels in image 11 for which the processing of step A has been completed, the connectivity to the black pixel which has been connected to the above unresolved pixel is maintained, unresolved pixels are classified from black and white pixels, and a thinned image is produced. A summary of step T is shown in FIG. 9.

[step T]

Step T1:

In this step, the pixel of the center point of the interval in which the unresolved pixels are connected in the Y direction is changed to a black pixel or a white pixel. When a plurality of separated unresolved pixels which are above the same X coordinate are present, processing is carried out starting from the unresolved pixel having the smallest Y coordinate. First, one unresolved pixel to be processed is selected from the direction in which X is small (X=X0). Next, starting from the direction of a small valued Y, the pixels of the Y direction when X=X0 are checked and, from among those domains in which one or more connected unresolved pixels appear, one domain is selected. This interval is set to X=X0 and $Y_t \leq Y \leq Y_B$ ($Y_T$ is the upper tip of the connective interval of the unresolved pixel and $Y_B$ is the lower tip of the connective interval of the unresolved pixel). Next, (1) When $Y_B - Y_T = 0$ or 1 (i.e., when the connective interval of the unresolved pixel in the Y direction is one or two), the thinning decision procedure for unresolved pixels (procedure H) is processed as the coordinates of the unresolved pixels of the initial point (X0, $Y_T$), and as the coordinates of the unresolved pixels of the final point (X0,$Y_B$), and the processing of step T1 and step T2 are ended for this interval. Furthermore, (2) When $Y_B - Y_T \geq 2$, only the center point of the connective interval of this unresolved pixels (when the number of connected pixels is an odd number, the pixel closest to the center point with the smaller Y coordinate) is set as the black pixel of the center point ($X_C, Y_M$) of the connective interval of the unresolved pixel, and then step T2 is proceeded to.

Step T2:

In this step, the connectivity between the center point in the Y direction of the unresolved pixel aggregation and the black pixels which are adjacent above, below, to the right and to the left (left includes the left horizontal in the upper and lower direction and right includes the right horizontal in the upper and lower direction) of this unresolved pixel aggregation is maintained, and thinning process which changes each unresolved pixel into a black pixel or a white pixel is carried out. In other words, (X0,Y0) is set to the black pixel of the center in the Y direction of the unresolved pixels, and thinning, which maintains the connectivity of the black pixels horizontally adjacent to and to the left and right of an unresolved pixel of an interval of $X=X_0$ and $Y_T \leq Y \leq Y_B$, and which maintains the connectivity of the black pixels vertically adjacent to and above and below an unresolved pixel of this same interval, is carried out according to the following process. (a) The Y coordinate ($Y_U$) of the black pixel in the uppermost position among the horizontally adjacent black pixels to the right and left is obtained by the following process. In other words, coordinate ($X_0$, $Y_T-1$) is checked as to whether or not it is a black pixel (upper vertically adjacent black pixel), and, when it is a black pixel, is set to $Y_U=Y_T-1$ and (b) is proceeded to. When coordinate ($X_0, Y_T-1$) is a white pixel:

(1) In $X=X_0-1$, the black pixel which is in the domain of $Y_T-1 \leq Y \leq Y_M-1$ is investigated sequentially from the small direction of Y, and the coordinate ($X_0-1, Y_{UL}$) of the upper left adjacent black pixel for which the Y coordinate is smallest is obtained. When said pixel does not exist, $Y_{UL}=\{\phi\}$ is set. Here, $\{\phi\}$ indicates an empty aggregation. Next, (2) is proceeded to.

(2) In $X=X_0+1$, the black pixel in the limits of $Y_T-1 \leq Y_M-1$ is investigated sequentially from the direction of a small value for the Y coordinate, and the coordinate ($X_0-1, Y_{UR}$) of the upper right horizontally adjacent black pixel for which the Y coordinate is smallest is obtained. When said coordinate does not exist, $Y_{UR}=\{\phi\}$ is set. Next, (3) is proceeded to.

(3) $Y_{UL}=MIN(Y_{UL}, Y_{UR})$ is set and (b) is proceeded to. Here, $MIN(.,.)$ is the smaller of two numbers. When the two numbers are identical either may be selected. In the case where one of the numbers is the empty aggregation, the other number is selected. When both numbers are empty aggregations, $Y_U\{\phi\}$.

Next, (b) is proceeded to.

(b) The Y coordinate ($Y_D$) of the black pixel in the lowest position among the horizontally adjacent black pixels to the left and right is obtained according to the following process. In other words, coordinate ($X_0$, $Y_B+1$) is checked as to whether or not it is a black pixel (the lower vertically adjacent black pixel). From this result, when ($X_0$, $Y_B+1$) is black $Y_D=Y_B+1$, and (3) is proceeded to. When ($X_0$, $Y_B+1$) is white, the following (1) is proceeded to.

(1) In $X=X_0-1$, the black pixel in the limits of $Y_M+1 \leq Y \leq Y_B+1$ is sequentially investigated from the direction of a large value Y coordinate, and the coordinate ($X_0-1, Y_{DL}$) of the lower left adjacent black pixel for which the Y coordinate is largest is obtained. When the black pixel does not exist, $Y_{DL}=\{\phi\}$, and (2) is proceeded to. (2) In $X=X_0+1$, the black pixel in the limits of $Y_M+1 Y \leq Y_B+1$ is sequentially investigated from the direction of a large value Y coordinate, and the coordinate ($X_0=1, Y_{DR}$) of the lower left adjacent black pixel for which the Y coordinate is largest is obtained. When said black pixel does not exist, $Y_{DL}\{\phi\}$, and (3) is proceeded to.

(3) $Y_D=MAX(Y_{DL}, Y_{DR})$ and (c) is proceeded to. Here, $MAX(.,.)$ is the larger of two numbers. When the two numbers are identical, either may be selected. In the case where one of the numbers is the empty aggregation, the other number is selected. When both numbers are empty-aggregations, $Y_D=\{\phi\}$.

Next, (c) is proceeded to.

(c) The process of converting unresolved pixels which are not related to adjoining black pixels to white pixels is carried out. In other words, in $X=X_0$, (1) when $Y_U$ is an empty aggregation, each unresolved pixel of $Y_T \leq Y \leq Y_M-1$ is set to a white pixel and (2) is proceeded to. When $Y_U$ is not an empty aggregation and when $Y_T<Y_U$, each unresolved pixel of $Y_T \leq Y \leq Y_U$ is set to a white pixel and (2) is proceeded to. When this is not the case, (2) is proceeded to without anything being done.

(2) When $Y_D$ is an empty aggregation, each unresolved pixel of $Y_M+1 \leq Y \leq Y_B$ is set to a white pixel and (2) is proceeded to. When $Y_D$ is not an empty aggregation and when $Y_D \leq Y_B$, each unresolved pixel of $Y_D \leq Y \leq Y_B$ is set to a white pixel and (d) is proceeded to. When this is not the case, (d) is proceeded to without anything being done.

(d) In this step, processing of unresolved pixels for which it is necessary to maintain their connectivity with the black pixels adjacent above, below, to the left or to the right is carried out. In other words, according to the thinning decision procedure for unresolved pixels (procedure H) recorded below, the unresolved pixel of the divisions of $$X=X_0, Y_U+1 \leq Y \leq Y_M-1 \text{ and } Y_M+1 \leq Y \leq Y_D-1$$

are converted to black or white pixels. Here, when $Y_U$ or $Y_D$ is an empty aggregation, they are set to be outside the interval included in the parameters. Next, the results are stored in image 11 and step T2 ends.

Step T3

Steps T1 and T2, which comprise procedure T, are carried out for the interval in the Y direction for which unresolved pixels of a single X are to be connected. Additionally, X is increased and the same process is repeated for all unresolved pixels.

(End of procedure T)

Figure 10:
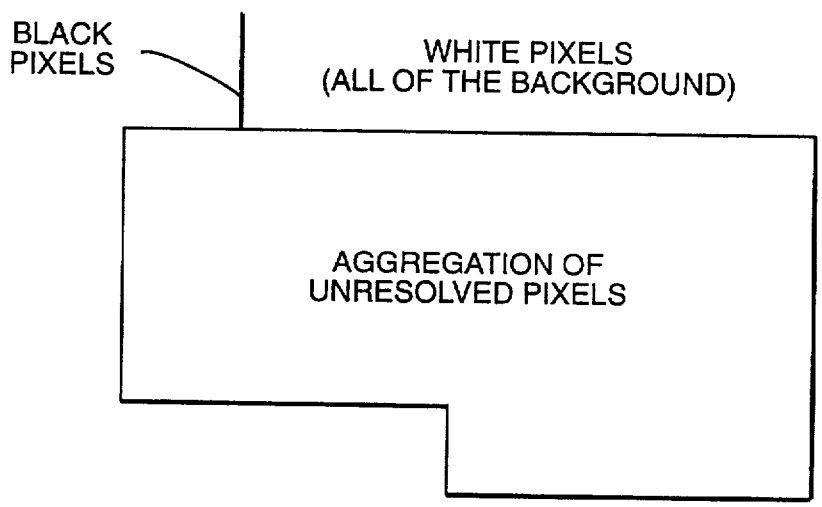
FIG. 10a and 10b is an example showing the abbreviation of the thinning for unresolved pixels.
Figure 10:
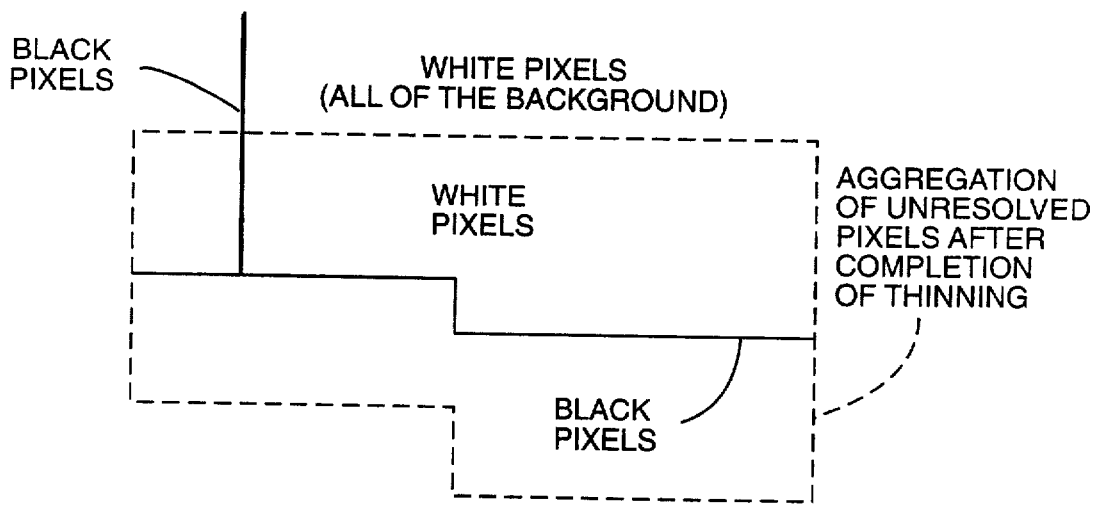

FIG. 10 is an example of an unresolved pixel and its thinning. FIG. 10 (a) shows the thinning of an aggregation of the unresolved pixels resulting from procedure A, and of the black pixels which are to be connected to these. FIG. 10(b) shows the result of thinning of unresolved pixels according to procedure T (the dotted line is the outline of the original aggregation of unresolved pixels which do not exist in reality but are noted for the purpose of explanation).

Figure 11:
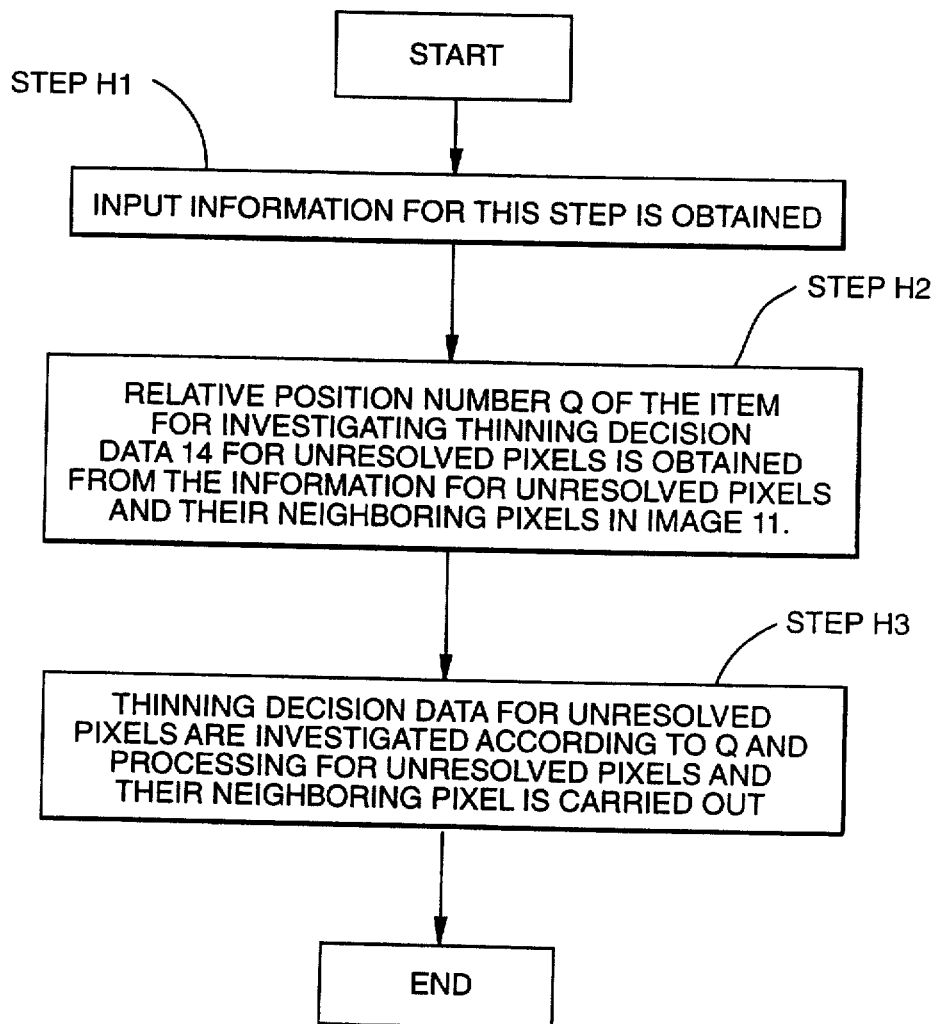
FIG. 11 is an abbreviation of the process for thinning decision data for unresolved pixels (procedure H)

An example of the thinning decision process for unresolved pixels which is used in step T is shown in the following procedure H. An example of a table which has the thinning decision data 14 for unresolved pixels of memory 6 used in procedure H is shown in FIG. 12. As shown in the table of FIG. 12, central processing device 5 carries out inspection through a relative position given from the table head, without relative position number Q given from the head of the table being stored in the data in image processing device 1. An abbreviation of procedure H is shown in FIG. 11.

[Procedure H1]

Step H1:

Coordinates ($X_0, Y$) of the unresolved pixel of an initial point and coordinates ($X_0, Y$) of the unresolved pixel of a final point for thinning process image 11 are obtained as input information related to this step. Here, Y coordinate of unresolved pixel at initial point $\leq$ Y coordinate of unresolved pixel at final point, and, X coordinate of unresolved pixel at initial point=$X_0$ must be true. Furthermore, progressing in the Y direction, all of the pixels from the unresolved pixel of the initial point to the unresolved pixel of the final point must be unresolved pixels.

step H2:

For the interval of unresolved pixels in the Y direction, the following process is carried out sequentially on P0, beginning with the initial point of the unresolved pixel of the center of the pixel aggregation (P0) through the final point in a 3×3 pixel matrix, in the increasing direction of Y and depending on the 8 neighboring pixels. The bit values for an unresolved pixel (P0) which is to be thinned and for its eight neighboring pixels (P1~P8) are set as white pixel=0, black pixel=1, and unresolved pixel prior to thinning=1, and the relative position number Q Of the item (individual elements of the table will be called "item") of the thinning decision data table for unresolved pixels is according to the following $$Q=P_8\|P_7\|\ldots\|P_1$$

($\|$ indicates a concatenation. In this case, a hexadecimal indicator, the region for which Q is obtained is 00–FF (in the table in FIG. 4, Q becomes the hexadecimal indicator)).
Step H3:

Because the value of Q becomes the item number of the table in thinning decision data 13 for an unresolved pixel, the position of the item in the table of thinning decision data 13 for an unresolved pixel is obtained directly from Q (Q=relative address from the table head=item number X size of one item). Next, according to the conversion assortment of the thinning decision data for an unresolved pixel, processing is carried out for an unresolved pixel P0. Processing for a conversion assortment of the table (the setting of the black and white pixels is carried out directly following the completion of a decision for a P0) is as follows. At conversion assortment 00, unresolved pixel P0 is converted into a white pixel, at conversion assortment 01, unresolved pixel P0 is converted into a black pixel. 02, 03 are separate processes. At conversion assortment 02, unresolved pixel P0 is converted into a black pixel and, additionally, P3 is converted into black pixel. At conversion assortment 03 unresolved pixel P0 is converted into a white pixel and P5 is converted into a black pixel Additionally, in response to the character and objective of the desired image, the processing for these conversion assortments can be renewed and a conversion assortment can be supplemented. As a result of the above, image information in which an unresolved pixel of an indicated region has been converted to a black or white pixel is output to thinning process image 11 of image memory 4.
(End of procedure H)

In FIG. 1, image memory 4 may be combined with memory 6. Furthermore, in the case where an input device which directly obtains a digitalized image is used, A/D converter 3 may be abbreviated. In the preferred embodiments of the present invention, a pixel aggregation of a 3×3 arrangement is used in the thinning decision table for unresolved pixels. However, the method of the present invention may also be appropriately applied to a pixel aggregation of an N×N matrix (N=2,3,4,5, . . . ). The allotment of the program and hardware in the present invention is optional. The method of setting the value of the fixed value W in procedure A is optional and there are, for example, the method of presetting, the method of measuring from the desired image, and the like. It is necessary to renew the table of thinning decision data for unresolved pixels in FIG. 4 in response to the characteristics of the image, the objective of the thinning and the method of setting straight lines Lx, Ly. Smoothing or correction may be carried out beforehand on a binary image or a gray scale image for which thinning processing is to be carried out. The value of set value W in step A1 of procedure A is set using the characteristics of the image (for example, the line widths constructing the image). In the preferred embodiments of the present invention, 8-neighbor connected connectivity is used. However, this can be changed to the case where 4-neighbor connected connectivity is used. In the case where the quality of the thinned image obtained in procedure T is insufficient, in place of procedure T, which is the second process of the method of the present invention, an optional method (such as the thinning method of Hilditch (for example "Multi-sided Image Processing and Related Software System Research", Tamura et al., Research Report of Electrotechnical Laboratory), No. 835,1984) can be appropriately used.

In procedure A, when sectionally ignoring connectivity and carrying out approximate thinning, step A2 of procedure A is omitted. In procedure T, when sectionally ignoring Connectivity and carrying out approximate thinning, the thinning decision data for an unresolved pixel can be set without giving consideration to the connectivity.

An example of the process of classifying the black pixels, the white pixels and the unresolved pixels for which thinning is unresolved, is shown in step BZ for the case where simultaneously carrying out thinning and binarization of a gray scale image and obtaining a thinned image. In this case, a thinned image is stored in original image 10. (According to the application of the procedure T to the executed results of procedure BZ, in the same manner as the case where procedure T is applied to procedure A, it is possible to obtain a thinned image for which thinning has been completed), The differential value ΔX in the direction of X in the coordinate (X,Y), $1 \leq X \leq X_h-1$ is shown by the following differential equation.

$$\Delta X = f(X+1,Y) - f(X-1,Y)$$

Here, because ΔX is the boundary of the coordinate when X=0 and X=Xh, it does not exist. The differentiated value ΔY in the direction of Y in the coordinate (X,Y), $1 \leq Y \leq Y_h-1$ is shown by the following differential equation.

$$\Delta Y = f(X,Y+1) - f(X,Y-1)$$

Here, because Δy is the boundary of the coordinate when Y=0 or Y=Yh, it does not exist. (The differential value may be defined by some other method.)
[Procedure BZ]
Step BZ 1:

Here, original image 10 is classified into one or more sub-divisions, and the average brightness value is obtained for each division. In other words, one sub-division is set to the quadrangular division of $$X_S \leq X \leq X_S+X_L-1, \text{ and } Y_S \leq Y \leq Y_S+Y_L-1$$

The average brightness of the sub-division=

$$\sum_{Y=Y_S}^{Y_S+Y_L-1} \left[ \left( \sum_{X=X_S}^{X_S+X_L-1} f(X,Y) \right) / X_L \right] / Y_L$$

Step BZ 2:

In this step, thinning according to an investigation in the X direction, is carried out as follows. According to this step BZ 2, sections other than unresolved pixels are processing in the X direction.

(a) The brightness distribution of the X direction is checked when Y is set to a fixed value Y0 (Y0 changes sequentially from 0 to Yh) and the minimum and maximum are obtained by the following (1) and (2). Following this, (b) is proceeded to.
(1) Minimum Because the smallest point in Y=Y0 fulfills all of the following conditions, first condition S1 is checked and a candidate for the minimum is obtained. Next, when this candidate for minimum fulfills the S2 conditions, the X having the minimum is obtained. A minimum indicates a black pixel.

[condition S1]

The candidate for a minimum is the X coordinate having the smallest degree of brightness within X, X+1, and X−1 which are the neighborhoods of the X coordinate, the differential of which changes from negative to positive.

[condition S2]

The brightness of the candidate for a minimum is less than the average value of the brightness of the sub-division associated with this pixel.

(2) Maximum

Because the maximum in Y=Y0 fulfills all of the following conditions, first, condition L1 is checked and a candidate for the maximum is obtained. Next, when this candidate for the maximum fulfills the L2 conditions, the X having the maximum is obtained. The maximum indicates a white pixel.

[condition L1]

The candidate for a maximum is the X coordinate having the greatest degree of brightness within X, X+1, and X-1, which are the neighborhoods of the X coordinate, the differential of which changes from positive to negative.

[condition L2]

The brightness of the candidate for the maximum is greater than the average value of the brightness of the sub-division associated with this pixel.

(b) In Y=Y0, the X values of the X having a minimum and maximum obtained in (1), are lined up in order of small X, (1) For an X which is a minimum immediately preceded and followed by maximum points, and which satisfies the following, (brightness of immediately preceding maximum point−brightness of minimum point)≧V, and (brightness of immediately proceeding maximum point−brightness of minimum point)≧V, the pixel of (X, Y0) is set to black. Here, V is a predetermined number. Next, (2) is proceeded to. (2) X in which continuous minimum points other than those of (1) above appear, are set as an unresolved pixel and the data of the pixel joining these is set to the data of the unresolved pixel. Furthermore, the region of the unresolved pixel (X coordinate of the left margin and the X coordinate of the right margin) is memory stored. Next (3) is proceeded to.

(3) Pixels in Y=Y0 other than the above (1) and (2), are all set to white pixels. Next, III is proceeded to.

(c) Here, for image 11, the connectivity of the black pixels of the X axis and of lines parallel to the X axis is checked for the coordinates of the pixel set to a black pixel (set to coordinate (X0, Y0)) and the immediately preceding Y coordinate, Y=Y0 (original image 10 is also referred to), and if necessary are connected. In other words, the same processing as step A2 of procedure A is carried out.

(End of procedure BZ)

VII. Procedure for Narrowization Processing

Aggregations of one or more black pixels are treated as the lines of an image. The method of maintaining the designated value of the line width is optional, and both the method of maintaining the designated value of the line width as input information of the narrowization process and the method of maintenance within the narrowization process are possible. It is also possible to maintain one or more designated line width values within a single narrowization processing procedure. In the preferred embodiments of the present invention, the procedure of narrowization processing can be appropriately used in response to the designated value of the line width. However, image processing device 1 can be equipped with only a narrowization processing procedure for the designated value of the line width corresponding to the first image and with a narrowization processing procedure corresponding to the second image. An example of a narrowization processing procedure which relies on the designated value of the line width follows below.

(1) Narrowization Processing for Setting the Majority of the Line Widths to the Width of One Pixel (the designated value of the line width is one pixel)

It is possible to use a conventional method (i.e., a narrowization method which can set the majority of the line widths to the width of one pixel) as a procedure for narrowing the line width of a binary image (or a procedure for binarizing a gray scale image and narrowing the line width). Furthermore, there are also methods for directly binarizing and narrowing a gray scale image.

(2) Narrowization Processing for Narrowing the Majority of the Lines to a Width Below the Value of a Designated Line Width (the designated value of the line width is an optional numeric value)

This may be realized by the conventional method. For example, a method such as the following is available.

a) In the case of a narrowization process in which the process of removing the components of a line one pixel at a time is repeated from the outer side of a line which comprises an image (in the preferred embodiments of the present invention, corresponding to the black pixels which are the fingerprint lines) until the majority or the line widths have become one pixel, the repetition number in the narrowization process may be set so that Repetition Number = {(largest line width of the original binary image) − (designated value of line width)}/(approximate value of the number of pixels which are to be deleted each line width by line width by means of deletion processing of a section of an image plane)

b) A Narrowization Method. Wherein Black Pixels are Left Out of the Center of the Line Components Which Compose an Image For the black pixels above the line segment of a section where an optional straight line and the line of an image intersect, narrowization can be accomplished through keeping the black pixels below the indicated value of the line width which includes the center of said line segment (in the case where the line segment width is above the indicated value for the line width, the center point of a line segment is set as the center and the black pixels of the indicated value of the line width are kept and all of the black pixels above the line segment for which the line segment width does not satisfy the indicated value of the line width are kept).

A concrete example of the procedure is shown in procedure F.

In the preferred embodiments of the present invention the situation is disclosed wherein the X axis and lines parallel to it are utilized as one straight line Lx and its parallel lines, and the Y axis and lines parallel no it are used as a straight line Ly and its parallel lines, this line Ly forming an angle of a fixed degree greater than 0 degrees with straight line Lx (i.e., the turning angle is 90 degrees). A parallel line will be only a lane which passes through each coordinate. The input information of procedure F is the image input information. The output information is the output image.

(Procedure F)

Step F1 (narrowization processing in the X direction):

In this procedure, black pixels above the X axis and lines parallel to it, are reclassified into white and black pixels. For image 10, $Y=Y_0$ ($Y_0=0,1,2, \ldots Y_h$), and the limits of the connectivity of the current black pixels is set to $X_{Li} \leq X \leq X_{Hi}$ ($i=1,2,\ldots$). Next, with respect to the entire X direction, for the sections of connected black pixels which are above the indicated value $w_x$ of the line width (i.e., the interval of the line segment $X_{Li} \leq X \leq X_{Hi}$ which is the coordinate $(X, Y_0)$ for an i satisfying $X_{Hi}-X_{Li}1 \geq w_x$), when the length of the line segment (pixel number) is greater than $w_x$ $w_x$ black pixels are kept about the center point of the line segment, and all black pixels which are above the line segment for which the length of the line segment is less than $w_x$ are kept.

The above results are set in image 10. $Y_0$ is increased by one, and this procedure is carried out for all $Y_0$.

Step F2 (narrowization processing in the Y direction):

In this procedure, black pixels above the Y axis and lines parallel to it, are reclassified into white and black pixels. For image 10, $X=X_0$ ($X_0=0,1,2, \ldots X_h$), and the limits of the connectivity of the current black pixels is set to $Y_{Li} \leq Y \leq Y_{Hi}$ ($i=1,2,\ldots$). Next, with respect to the entire Y direction, for the sections of connected black pixels which are above the indicated value $w_y$ of the line width (i.e., the interval of the line segment $Y_{Li} \leq Y \leq Y_{Hi}$ which is the coordinate $(X_0, Y)$ for an i satisfying $Y_{Hi}-Y_{Li}+1 \geq w_y$), when the length of the line segment is greater than $w_y$, $w_y$ black pixels are kept about the center point of the line segment, and all black pixels which are above the line segment for which the length of the line segment is less than $w_y$ are kept.

The above results are set in image 10. $X_0$ is increased by one, and this procedure is carried out for all $X_0$.
(End of procedure F)

c) After thinning, the line width of the image can be expanded. In the preferred embodiment of the present invention, when carrying out narrowization processing on a registered fingerprint image and a fingerprint image undergoing testing, the indicated value for line width can be optionally set. However, it is necessary to set the value on the basis of such factors as the quality and characteristics of the input image, the performance with respect to the indicated value for line width in narrowization processing, the performance demanded of image processing device 1, etc. If the difference between the indicated values for line width in the narrowization processing of a registered fingerprint and a tested fingerprint, respectively, is large, the errors in position matching of both images becomes considerable, and if this difference becomes too large, a decrease in the accuracy of the comparison sometimes occurs. Providing a smaller line width for the modified image of a registered fingerprint allows the amount of memory required for registered information to be smaller due to the decreased number of pixels. If the above is taken into consideration, either of the following indications will be effective.

(1) In the narrowization processing of the registered fingerprint image, the indicated value of the line width is set to one pixel, and, in the narrowization processing of the tested fingerprint, the indicated value of the line width is set to an appropriate value greater than 2 pixels (for example, 3 pixels).

(2) Values are selected appropriate to the condition wherein the indicated value of the line width for the narrowization processing of the modified image of a registered fingerprint is set to a value smaller than the indicated value of the line width of the tested fingerprint.

In the following preferred embodiments, the situation given in the above (1) is recorded.

VIII. Partial Conversion Processing of the Pixels of a Registered Image

The following effects are obtained due to the partial conversion of the black pixels of a registered image (i.e. the pixels to be processed) into white pixels in the limits which have no effect upon the accuracy of the comparison. 1) The processing quantity for the comparison decreases due to the decrease of the black pixels of the sub-template portion, and the file quantity of the recorded information decreases. 2) The file quantity for the recorded information is decreased due to the decrease of the black pixels of the non sub-template portion. In this step, omission of the comparison of the fingerprint is possible, and, in particular, it is possible to reduce the file quantity and processing quantity when necessary.

Procedure D is an example of the process to convert black pixels of the registered image into white pixels.
(Procedure D)
Step D1 (processing in the X direction):

$Y=a \cdot j$, ($0 \leq X \leq X_h$; $0 \leq Y \leq Y_h$; a is a predetermined number ($2 \leq a < Xh$); $j=0,1,2,\ldots,$), the above black pixels are converted into white pixels.
(processing in the Y direction):
Additionally, in procedure D, partial (Number of black pixels of registered
conversion = information following partial conversion
rate    number)/(Number of black pixels in
        original binary image)
$= \{(a-1)/a\} \cdot \{(b-1)/b\}$.

In the limits which have no effect upon the comparison accuracy (for example, 0%~20% for the complete body), due to the conversion of black pixels into white pixels, the data quantity of recorded information is reduced only by the portion of the black pixels which are converted within the template. The quantity of the comparison processing is reduced only by the quantity of the processing to the black pixels converted within the template portion.

IX. Process for Recording the Registered Information of a Registered Image

The process of recording fingerprint information involves the process of extracting sub-template RT(0) and non sub-template RB(0) from the registered fingerprint image Rth in image 10, which results from the input, as the registered fingerprint, of image memory 4 to image 10, the carrying out of processing through narrowization processing, and then the storing of template RT(0) and non sub-template RB(0) in each file. The steps for carrying out the recording process of the fingerprint information are shown in procedure R. The input information of procedure R is the file name of the sub-template and non sub-template of the registered fingerprint, the registered fingerprint image Rth, the fingerprint boundary information of the registered fingerprint and the approximate center point of the registered fingerprint ($X_{RC}$, $Y_{RC}$). The output information of procedure R is the file of the sub-template RT(0) and the file of the non sub-template RB(0).
(Procedure R)
Step R1 (formation of sub-template RT(0)):

Black pixel addresses within the fingerprint area and in the limits of sub-template RT(0) are extracted from registered fingerprint variable image Rth, and the file of sub-template RT(0) is formed. In the file stored in RT(0), the approximate center point of the registered fingerprint ($X_{RC}$, $Y_{RC}$) is also stored.

Step R2 (formation of non sub-template RB(0)):

A black pixel address which is outside sub-template RT(0) and within fingerprint area FA is extracted from the transposed recorded fingerprint image Rth, and the file of non sub-template RB (0) is formed.

(End of procedure R)

The method of storage of each file of the sub-template and the non sub-template is optional. For example, data may be compressed and stored in a file and, at utilization, data elongation may be carried out.

X. Memory Processing of Image Data

When storing the address of each black pixel (X,Y) as is in a file, the quantity of storage memory necessary is as follows:

> Storage memory quantity = (Number of black pixels) ·
> ((Memory quantity for X
> coordinate unit) +
> (Memory quantity for Y
> coordinate unit))

It is necessary to memory store respectively information regarding the sub-template and the non sub-template in a file for a registered fingerprint image. Examples are shown in the following M1, M2, or M3, of the process for carrying out compression and storage in file when storing as is the black pixel addresses of the binary image data.

Method M1

Figures 8, 13:
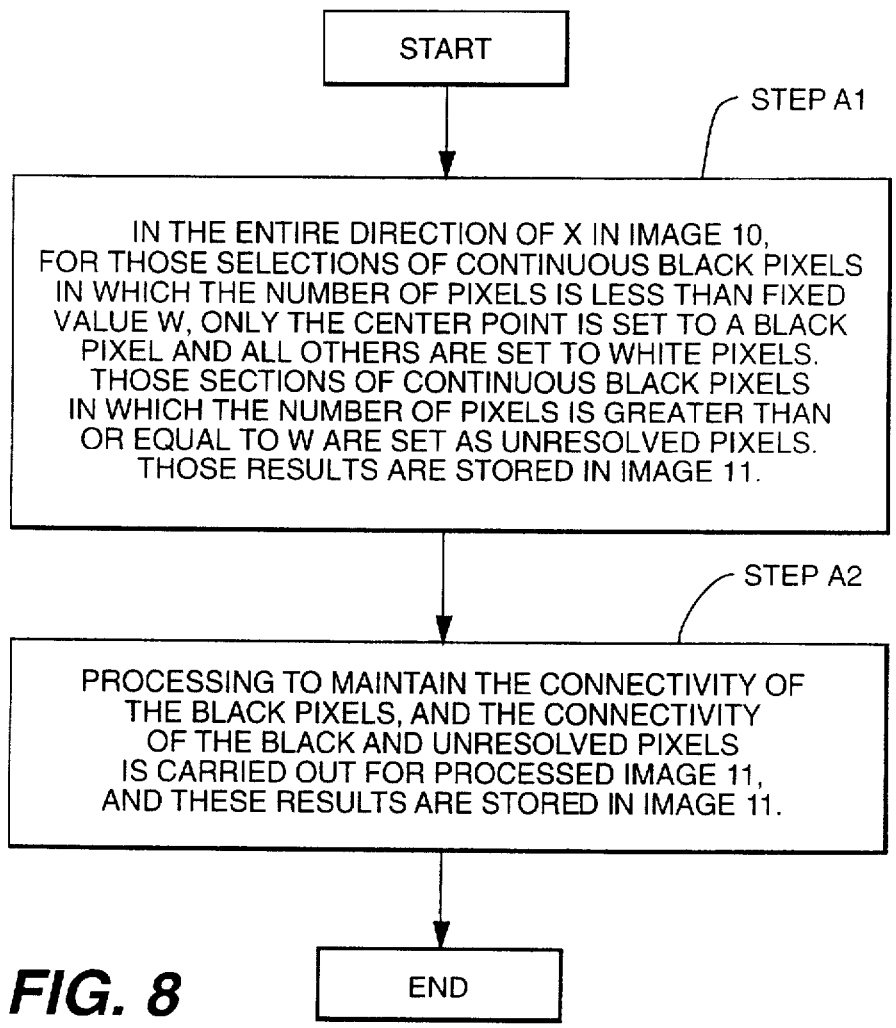
FIG. 8 is an abbreviation of the partial process of thinning a binary image (i.e., procedure A)
FIG. 13 is an example of the division of a registered image into 3×3 pixel aggregations.

The pixel aggregation recorded herein is for the case of a 3×3 pixel matrix. A 3×3 pixel aggregation is shown in FIG. 3($a$). An example of a part of the image data is shown in FIG. 13. A representative pixel is set to $P_4$ and the classification of each pixel as black and white pixels within the pixel aggregation is indicated by bits. According to, $$G=P_8\|P_7\|P_6\|P_5\|P_3\|P_2\|P_1\|P_0$$

($\|$ indicates concatenation. Representative pixel $P_4$ is not included in G)

the black and white condition of each pixel can be shown by the neighboring pixel code G of 1 byte (hexadecimal digits 00–FF). $P_4$ is the bit of the surplus of the X coordinate address part, and indicates the classification between the white and black pixels (for example, when the X coordinate address is 1 byte, (X coordinate address/3) is indicated by 7 bits and the classification of white and black pixels of representative pixel $P_4$ is indicated by other bytes).

Next, according to representative pixel $P_4=(X_4,Y_4)$ and its relative position, pixel address (X,Y) becomes as follows.

$P_0$: $X=X_4+1$, $Y=Y_4+1$
$P_1$: $X=X_4+2$, $Y=Y_4+1$
$P_2$: $X=X_4+2$, $Y=Y_4$
$P_3$: $X=X_4+1$, $Y=Y_4$
$P_4$: $X=X_4$, $Y=Y_4$
$P_5$: $X=X_4$, $Y=Y_4+1$
$P_6$: $X=X_4$, $Y=Y_4+2$
$P_7$: $X=X_4+1$, $Y=Y_4+2$
$P_8$: $X=X_4+2$, $Y=Y_4+2$

Next, compression processing will be explained. At the time of compression, the (X,Y) coordinates of the image data are converted to the following form. For the area within the activated region of the fingerprint, each third X coordinate is set to each third Y coordinate as the representative pixel and a check is made of whether or not there are any black pixels in the 3×3 pixel aggregation (initial point, etc. depends on the setting of the pixel aggregation). Only when black pixels are present are the X coordinate of the representative pixel and the pixel aggregation code memory stored. (For elongation, the opposite process may be carried out). The storage method of the storage media is as follows.

$Y = 3j$: stored X coordinate set number {($P_4$ B/W classification bit (initial 1 bit) + (X coordinate of the representative pixel $a_j/3$)), pixel aggregation code), ($P_4$ B/W classification bit (initial 1 bit) + (X coordinate of the representative pixel $b_j/3$)), pixel aggregation code), ... } is set (j=0,1,2, ... ). In place of the stored X coordinate set number of the black pixel, a termination sign of the X coordinate values with respect to the value of each Y coordinate may also be added. Here, the $Y_0$ coordinate of the stored X coordinate set number which is equal to zero is packed without being set. A 3×3 pixel aggregation in which all of the pixels are white is jumped. Although a 3×3 arrangement is recorded herein for the pixel aggregation, this can be optionally set (for example, 4×4 pixels, 5×3 pixels, etc.). The position of the representative pixel within each pixel aggregation can be optionally set. In order to judge whether the representative pixel is black or whites an indicator may be added for one of the black/white pixel classification. The initial boundary and length (RT(0) and RB(0) in these embodiments) of the image data is set so as to become a three time larger number.

Remarks: An example of the data reduction ratio in method M1 of the image data compression step follows.

The X and Y coordinates of the original image are indicated respectively by 1 byte (because it is a binary image it is possible to indicate the degree of brightness by one bit, however, when so doing, the access processing quantity becomes large), and the case where the brightness is stored by one byte is compared to. For the domain of one pixel aggregation, > Data
> reduction = (Data quantity following compression)/
> ratio (Original data quantity)
> = [(probability of there being one or more black
> pixels in a 3 × 3 pixel aggregation) ×
> {(memory quantity for storage of the X
> coordinate) + (memory quantity for storage
> of B/W pixel classification) + (memory
> quantity for storage of neighboring pixel
> codes)}]/{(number of pixels in pixel
> aggregation) × (memory quantity for storage
> of pixel units)} and the probability that there are one or more black pixels in a pixel aggregation is $\lambda$. When the memory stored quantity of the black and white pixel classification of the representative pixel is set to 1 byte (although 1 bit is permissible, the region is set to 1 byte), Data reduction ratio=$2\lambda/9$ (when $\lambda=0.1$, the data reduction ratio is, for example 0.0222, and, when $\lambda=0.05$, is 0.0111).

Method M2

The pixel aggregation recorded herein is for the case of a 4×4 matrix of a pixel aggregation. A 4×4 pixel aggregation is shown in FIG. 3 for optional representative pixel $P_0$. The black and white classification of each pixel is shown by bits. The black pixel condition and the white pixel condition of each neighboring pixel can be shown by the 2 byte pixel aggregation code G (0000–FFFF by hexadecimal digits), according to $$G=P_{15}\|P_{14}\|P_{13}\|\ldots\|P_7\|P_6\|P_5\|P_4\|P_3\|P_2\|P_1\|P_0.$$

Next, depending on representative pixel $P_0=(X_0,Y_0)$ and its relative position, pixel address (X,Y) become as follows:

$P_1$: $X=X_0-1$, $Y=Y_0$
$P_2$: $X=X_0-2$, $Y=Y_0$

P3: X=X0−3, Y=Y0
P4: X=X0, Y=Y0−1
P5: X=X0−1, Y=Y0−1
P6: X=X0−2, Y=Y0−1
P7: X=X0−3, Y=Y0−1
P8: X=X0, Y=Y0−2
P9: X=X0−1, Y=Y0−2
P10: X=X0−2, Y=Y0−2
P11: X=X0−3, Y=Y0−2
P12: X=X0, Y=Y0−3
P13: X=X0−1, Y=Y0−3
P14: X=X0−2, Y=Y0−3
P15: X=X0−3, Y=Y0−3

The compression processing of the registered fingerprint image data is the process of converting the (X,Y) coordinate of the registered fingerprint image data (X=0~Xh, Y=0~Yh) to the following form. For the area within the activated region of the fingerprint, each fourth X coordinate is set to each fourth Y coordinate as the representative pixel and a check is made of whether or not there are any black pixels in the 4×4 pixel aggregation (initial point, etc., depends on the setting of the pixel aggregation). Only when black pixels are present is the X coordinate of the representative pixel and the pixel aggregation code memory stored. In other words, the file storage form is set to $Y = 3 + 4j$: X coordinate set number of black pixels
{(X coordinate of representative pixel $a_j$, pixel aggregation code), (X coordinate of representative pixel $b_j$, pixel aggregation code), ... } ...

(j=0,1,2, ... ). In place of the X coordinate set number of black pixels, a termination sign of the X coordinate values with respect to the value of each Y coordinate may also be added. The Y coordinate is stored one time only for the case where there is a black pixel of the X coordinate (i.e., when the number of sets of stored X coordinates is 0, the Y coordinate is packed without being set). A 4×4 pixel arrangement in which all the pixels are white is excluded.

In elongation processing, with respect to the compressed registered fingerprint image data, when reading out the file, elongation towards the form of (X,Y) (the opposite process of compression) is carried out. Additionally, the boundary information of the fingerprint is obtained from the right and left margin of the X coordinate value with respect to each Y coordinate value for, for example, the compressed file storage form of RB(0).

Method M3

When the pixel aggregation consists of only one pixel, the non-representative pixel is an empty aggregation and in this case the memory form is set to, {value of Y coordinate $Y = j$, the number value of X coordinate of black pixels; X coordinate $j_1$ of black pixel, X coordinate $j_2$ of black pixel, ... } ...

(j=0,1,2, ... ). Here, only for the case where there is a black pixel of the X coordinate is the value of the Y coordinate read one time only.

Additionally, in place of the X coordinate number value of the black pixel, a termination sign of the X coordinate values with respect to the value of each Y coordinate may also be added.

XI. Comparison Processing of Registered Image and Tested Image

Comparison processing is the process of checking the concordance of each black pixel of a black pixel aggregation in an image (modified image) of a fingerprint undergoing testing, this fingerprint having been input to image 10 of image memory 4 as a fingerprint to be tested and having undergone all processes through narrowization processing, to each black pixel in a black pixel aggregation which has been stored in memory 6 as recorded information related to a registered fingerprint.

Narrowed images (or fingerprints) are called modified images (or fingerprints). However, "narrowed" and "modified" are omitted in many cases. Coordinate conversion which relies on rotational and parallel displacements in order to position match a registered fingerprint and a tested fingerprint, can be carried out for either image. However, in the preferred embodiments herein, in order that the set value of the line width of narrowization processing is smaller in the recorded fingerprint for the area within the fingerprint area, the number of black pixels is assumed to become small and the registered image is moved and matched to the image undergoing testing.

What follows is a summary of comparison processing.

(1) Comparison using the Sub-template (first comparison)

The comparison of the sub-template is the process of obtaining the position at which the black pixels of the image of the registered fingerprint and the black pixels of the image of the fingerprint undergoing testing have the greatest degree of concordance. In other words, first, a sub-template RT(O, H,V), in which the approximate center of the registered fingerprint has been matched to the approximate center of the fingerprint undergoing testing, is obtained for sub-template RT(0) of the image of a registered fingerprint as result of parallel displacements of the coordinate axis of a registered fingerprint. Next, following the rotation and parallel displacements of the coordinate axis of sub-template RT(O,H,V) up, down, to the left and to the right in the neighboring area about the center, the transformation angle S and the parallel displacement quantity (horizontal displacement quantity H, vertical displacement quantity V) of sub-template RT(S,H,V) of the registered fingerprint at the point where the degree of matching between the black pixels of the registered fingerprint and the black pixels of the image of the fingerprint undergoing testing is the greatest is obtained (S,H,V are integers).

(2) Comparison using the non sub-template (second comparison)

The comparison of the non sub-template is the process of carrying out coordinate conversion of the black pixel address of RB(0) of the registered fingerprint according to S, H, V of RT(S,H,V) of the registered fingerprint which was obtained by comparison to the sub-templates and obtaining the black pixel address, checking the concordance of this address to the black pixel address of the image of the fingerprint to be tested, and outputting information related to the concordance of the registered fingerprint and the fingerprint undergoing testing. In other words, first, using the angle degree rotation quantity S, the horizontal displacement quantity H, and the vertical displacement quantity V, coordinate transformation of the black pixels of non sub-template RB(0) of the registered fingerprint is carried out, and RB(S,H,V) is obtained. Next, the concordance of the black pixels of RB(S,H,V) of the image of the registered fingerprint to the black pixels of the image of the fingerprint undergoing testing is checked.

(3) A check of the number of black pixels of a discordant section is carried out.

(4) As the final judging process, from the results of the concordance between the sub-template and the non sub-template and from the check of the discordant sections, a judgement is made on the agreement between the complete fingerprint area of the registered fingerprint and the fingerprint undergoing testing.

A procedure for carrying out comparison processing based on the above summary is shown in procedure C. The input information of procedure C is the file name of the sub-template and the non sub-template of the registered fingerprint, the image of the fingerprint undergoing testing and the approximate center point of the fingerprint undergoing testing. The output information of procedure C is the comparison result.

(Procedure C)

Step C1 (comparison using sub-template):

Step C1a:

Sub-template RT (0) is stored in memory 6 from the file. Next, using sub-template RT(0), S=Smin~Smax (incremental value Ks of S), H=Hmin~Hmax (incremental value Kh of H) and V=Vmin~Vmax (incremental value Kv of V), the following image concordance auxiliary procedure (procedure W) is executed by using the registered information search incremental value, Kr=Kra (Kra≧1).

From this result, for Smin~Smax, Hmin~Hmax, and Vmin~Vmax, the values of S, H, V are changed by increment values Ks, Kh, Kv respectively, and Sa, Ha, and Va, which are the values of the quasi-optimal S, H, and V are obtained.

Step C1b:

Using S, H, V, where

S: (Sa–Dsb)~(Sa+Dsb), incremental value Ksb

H: (Ha–Dhb)~(Ha+Dhb), incremental value Khb

V: (Va–Dvb)~(Va+Dvb), incremental value Kvb procedure W is executed according to the registered information search incremental value Kr=Krb (Krb≧1) of the black pixels of the registered information, and {Sb, Hb, Vb} which are the value of the quasi-optimal {S, H, V} are obtained. Here, Dsb, Dhb, and Dvb are predetermined numbers for setting the transposition region.

Step C1c:

Using S, H, V, where

S: (Sb–Dsc)~(Sb+Dsc), incremental value Ksc

H: (Hb–Dhc)~(Hb+Dhc), incremental value Khc

V: (Vb–Dvc)~(Vb+Dvc), incremental value Kvc

In a manner similar to Step C1b, procedure W is executed according to the registered information search incremental value Kr=Krc (Krc>1) of the black pixels of the registered information, and {Sc, Hc, Vc} which are the values of the quasi-optimal {S, H, V} are obtained. Here Dsc, Dhc, and Dvb are predetermined numbers for setting the transposition region.

Step C1d:

Procedure W is executed according to S, H, V where,

S=Sc, Dsd=0, incremental value Ksd=0

H=Hc, Dhd=0, incremental value Khd=0

V=Vc, Dvd=0, incremental value Kvd=0, and according to the registered information search incremental value Kr=Krd (Krd=1), and {Sm, Hm, Vm} which are the values of optimal {S, H, V} are obtained. Here, Dsd, Dhd and Dvd are predetermined numbers for setting the transposed region. From this result, each value of optimal {S, H, V} for which rate of concordance T1 of the sub-template becomes large and sub-template rate of concordance N1m/N1c are obtained.

Next, for predetermined number Tk1, if $$T1 \geq Tk1$$

the registered fingerprint and the fingerprint undergoing testing are judged to be concordant by means of the comparison of the sub-templates, and step C2 is proceeded to. If $$T1 < Tk1$$

the registered fingerprint and the fingerprint undergoing testing are judged to be discordant, and procedure C terminates.

Step C2 (comparison of the non sub-template):

Using the optimal S, H, V obtained from non sub-template RB(0) and step C1 as input information, an auxiliary image concordance check procedure (procedure W) is carried out. From this result, non sub-template rate of concordance T2=N2m/N2c is obtained. Next, for predetermined Tk2, if $$T2 \geq Tk2$$

the registered fingerprint and the fingerprint undergoing testing is judged to be concordant and step C3 is proceeded to. If $$T2 < Tk2$$

the registered fingerprint and the fingerprint undergoing testing are judged to be discordant and procedure C terminates. With regard to. T2, instead of the non sub-template rate of concordance, it is possible to use the template rate of concordance (i.e., (N1m+N2m)/(N1c30 N2c)).

Step C3 (comparison of discordant sections):

The discordance of the black pixels of the registered fingerprint and the black pixels of the fingerprint undergoing testing is checked. In the case where the black pixels in the discordant section of the image of the fingerprint undergoing testing are too many, removal is necessary. For this purpose, the following procedure is carried out to approximately obtain and judge the ratio of the black pixels of the discordant section at the point where the line width of the image of the fingerprint undergoing testing has been matched to the image of the registered fingerprint.

Step C3a:

The approximate region of the area of comparison of the image of the registered fingerprint of {S,H,V} is obtained from the region of RT(0) and RB(0). The coordinates (X',Y') of the region transposed from coordinates (X,Y) is, in the same manner as procedure W, found by the following formula.

$$X' = (X - X_{RC}) \cdot \cos(S) + (Y - Y_{RC}) \cdot \sin(S) + X_{TC} - H$$

$$Y' = (X - X_{RC}) \cdot \sin(S) + (Y - Y_{RC}) \cdot \cos(S) + Y_{TC} - V$$

Here, the cosine and sine functions indicate trigonometric functions.

step C3b:

The number of black pixels Tnw of the region of comparison following coordinate conversion of the image of the fingerprint undergoing testing (i.e., sum aggregation of RT(S,H,V) and RB(S,H,V,)) is counted. In other words, Tnw = total number of black pixels in the region of
comparison following coordinate conversion of
the fingerprint image undergoing testing At this time, the line width of the image of the fingerprint undergoing testing is set to w and the total number of black pixels Tnc when this line width of the image of the fingerprint undergoing testing is set to the line width of the image of the registered fingerprint (line width λ), is given approximately by $Tnc = Tnw/(w/\lambda)$ {When a partial conversion procedure (procedure D) has been carried out for the registered image of the fingerprint, $Tnc = (\text{partial conversion rate}) \cdot Tnw/(w/\lambda)$}.

Furthermore,

Nm=number of concordant black pixels within the region of comparison following coordinate conversion of the registered fingerprint information and the image of the fingerprint undergoing testing (=N1$m$+N2$m$)

Nc=total number of black pixels within the region of comparison following coordinate conversion of the registered fingerprint image (=N1$c$+N2$c$)

have already been obtained.

The degree of discordance of the black pixels between two images is, for example, set to $Tz = |Tnc - Nm|/Nc$, where Tz is the rate of discordance.
Then, if $Tz \leq Tkc$, the registered fingerprint and the fingerprint undergoing testing are, as the final procedure for comparison judging, judged to be concordant, or, in the case where these conditions are not met, are judged to be discordant. Here, Tkc ($0 \leq Tkc \leq 1$) is a predetermined number indicating the allowable ratio of the number of discordant black pixels of the fingerprint image undergoing testing, the smaller this number being, the stricter the conditions.
(End of procedure C)

Figure 14:
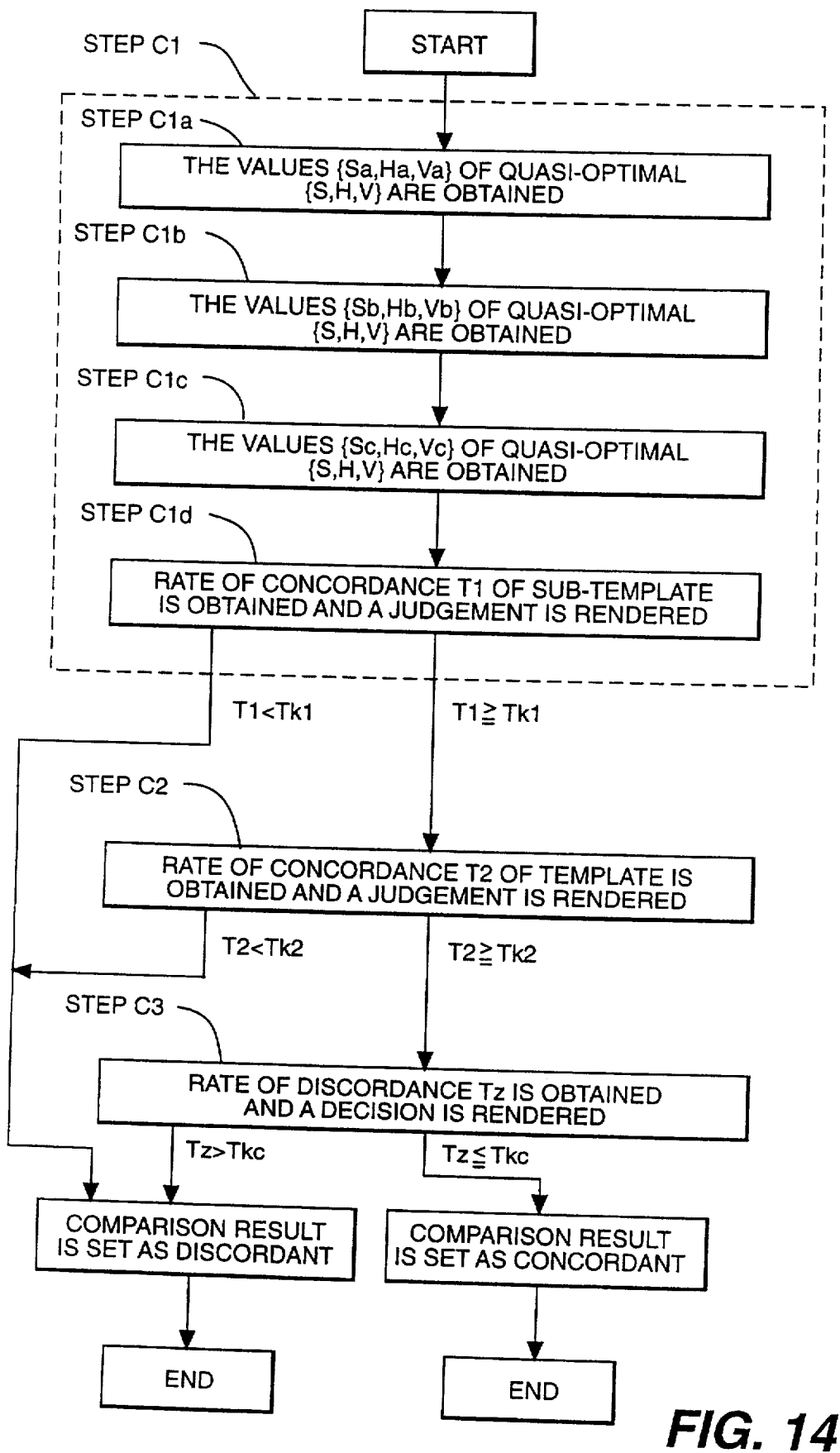
FIG. 14 is an abbreviated flow chart of comparison processing.

FIG. 14 is an abbreviated flow chart of comparison processing based on procedure C.

Figure 15:
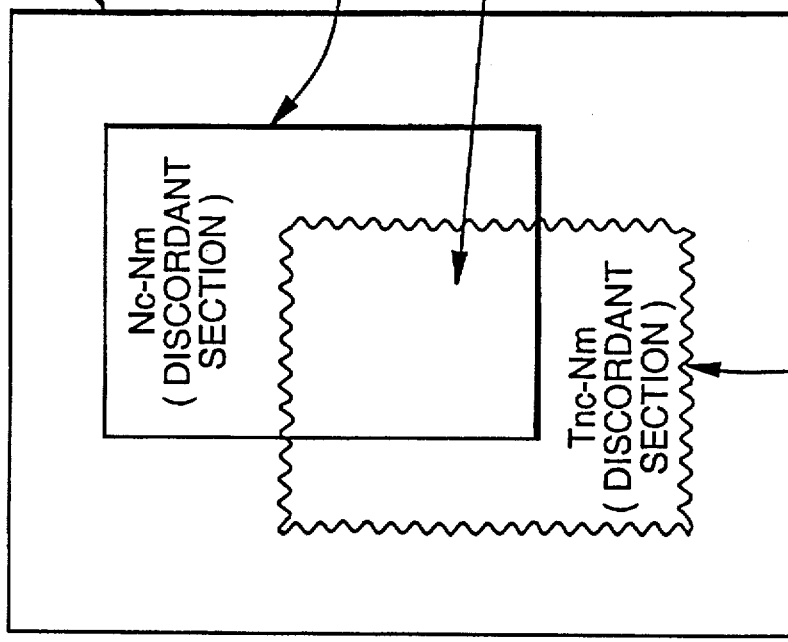
FIG. 15 is an explanatory drawing for computing the degree of discordance.

FIG. 15 is a conceptual diagram related to the parameters in step C3. FIG. 15 explains the relationship between the discordant sections and the concordant sections of the black pixel aggregation of the modified registered fingerprint image and the black pixel aggregation of the modified image of the fingerprint undergoing testing when the line width of the image of the fingerprint undergoing testing is made concordant to the line width of the modified image of the registered fingerprint.

Remarks C(1): Each value of the incremental values (Ks,Kh,Kv), which are the incremental widths of the primary translation in step C1$a$, is checked as large values over comparatively wide limits. A narrow value is set to each value of the incremental value (Ksb,Khb,Kvb) which is the increment of secondary translation on step C1$b$ and. comparatively small limits, which include the quasi-optimal values of the {S,H,V} obtained in step C1$a$, are checked. As a result of this, when the translation limits in position matching are made large, a greater reduction in the processing quantity can be planned for then when using a fine incremental value.

Next, the optimal value of the incremental value of translation and the characteristics of the number of rows will be described. As the prior proposed condition, the width increment of the final row is set to 1, the number of rows is set through the third row and, at other than the final row, jump processing is possible for those black pixels for which the incremental value Kr is set to 2 or above for the search for black pixels of the registered information. Furthermore, the translation limits for the search of the first row is set in order to have an effect on the comparison accuracy. As for the quality, the larger the incremental value of the translation, the smaller the number of searches becomes. The smaller the search limits, the smaller the search repetitions become. It is preferable that the initial line width be thick (Reason: the incremental value can be made large). Although it is preferable that the incremental value in midway row N (N=2, 3, . . . ) be small, it may be set optionally, taking into consideration the incremental values of the preceding and proceeding rows. The search limits from the second row and on are set by the incremental width of the previous row. If the incremental values from the second row and on is not set smaller than the previous row (below ½), no effect is registered for the various rows. In order to absorb the line strain, a thick line width is preferable. Because the errors in recognition decreases when the final line width is fine, the incremental width of the final row is set to 1.

In step C1 (a multi-stage process comprising 3 steps), the incremental value of each value of translation can be made larger than 1 (this value is dependent upon the line width of the narrowization of the tested fingerprint image) in the primary and secondary steps, the quasi-optimal values of S, H, and V which were determined in the prior step are set to the cardinal point in the secondary and tertiary steps, and it is permissible to carry out a comparison within the limits set according to the previous line width, etc. Because the number of black pixels of the registered image can be limited through a jump procedure which jumps a fixed number of the black pixels of the registered information depending upon the setting of the width increment Kr of the investigation of the black pixels of the registered information, the processing quantity of the comparison (approximately proportionate to the position matching search repetition) can be reduced. The translation limits of the primary step (Smin~Smax, etc.) are set according to the largest permissible limits at the time of fingerprint input.

The following characteristics are present. (1) The larger the translation limits the larger the number of search repetitions. (2) The smaller the incremental value the larger the search repetitions. (3) The increment value at a midway step is set taking into consideration the increment width of the immediately preceding or immediately proceeding step. (4) For steps other than the final step, jump search is possible. (5) When the setting of the translation limits, the incremental value and the jump search is not appropriate, errors in recognition occurs easily.

In step C3, the line width of the modified image of the tested fingerprint is set close to the value for the line width of the modified image of the registered fingerprint, and the rate of discordance of the sections is obtained. However, it is also possible to set the line width of the modified image of the registered fingerprint close to the value for the line width of the modified image of the tested fingerprint, and, in this manner, obtain the rate of discordance.

XII. Auxiliary Procedure for Checking Image Concordance

A summary of an auxiliary procedure for conducting a check on the concordance of two images is as follows. The approximate center point (XR,YRC) of the registered fingerprint for each pixel address (XR,YR) of the sub-template RT(0) or non sub-template RB(0) of the registered fingerprint is translated in parallel so as to become concordant to the approximate center point (XTC,YTC) of the fingerprint being tested. Next, the coordinate axis of the registered fingerprint is rotated and the black pixel (XR@,YR@) address following transition is checked as to whether or not there are any black pixels within the fingerprint area of the image of the fingerprint undergoing testing, and parallel displacement is again carried out. Where RT (S,H,V), the S, H, V and T1, N1m and N1c when a high rate of concordance T1 in each value of S, H, V is present is obtained. For RB(S,H,V), S, H, and V are each respectively 1, and the value wherein T2 is the largest is provided. Additionally, in the first and second comparison of this procedure, because T1 and T2, N1m and N2m, and N1c and N2c are the same, they will be called T, Nm, and Nc.

The input information of procedure W is the aggregation of black pixel addresses of the designated portion of the image of the registered fingerprint (either RT(0) or RB(0)), angle degree transposition quantity S of the coordinate axis (smallest value, largest value, incremental value), horizontal displacement H of the coordinate axis of the registered fingerprint (smallest value, largest value, incremental value), vertical displacement V of the coordinate axis of the registered fingerprint (smallest value, largest value, incremental value), the image of the fingerprint undergoing testing and the jump number J of the jump investigation of the black pixels of the registered fingerprint.

When comparing the black pixels of the registered fingerprint with those of the fingerprint undergoing testing, the registered information incremental value (i.e., jump number J) designates the increment by which the black pixel of the registered fingerprint is investigated. For example, when Kr=1 all of the black pixels of the registered fingerprint are investigated, and when Kr=2, every other black pixel of the registered fingerprint is investigated, The output information of procedure W is the optimal angle turning angle S about the coordinate axis for the registered fingerprint, the optimal coordinate axial horizontal displacement quantity H, the optimal coordinate axial vertical displacement quantity V, the number of concordant black pixels Nm of the image of the fingerprint undergoing testing and the image of the registered fingerprint for the designated region (either RT(0) or RB(0)), the total number of black pixels Nc of the image of the registered fingerprint of the designated region and the rate of concordance T. In the procedure, black pixels are checked up to a set number, and when the rate of concordance is below a stipulated cut-off value, for the parameter at that time, the processing is terminated midway. Furthermore, from the designation of the input information, when the similarity ratio is above a stipulated value for decision, the current $\{S,H,V\}$ are judged to be at the optimal value and the following comparison processing may be abbreviated.

Figure 16:
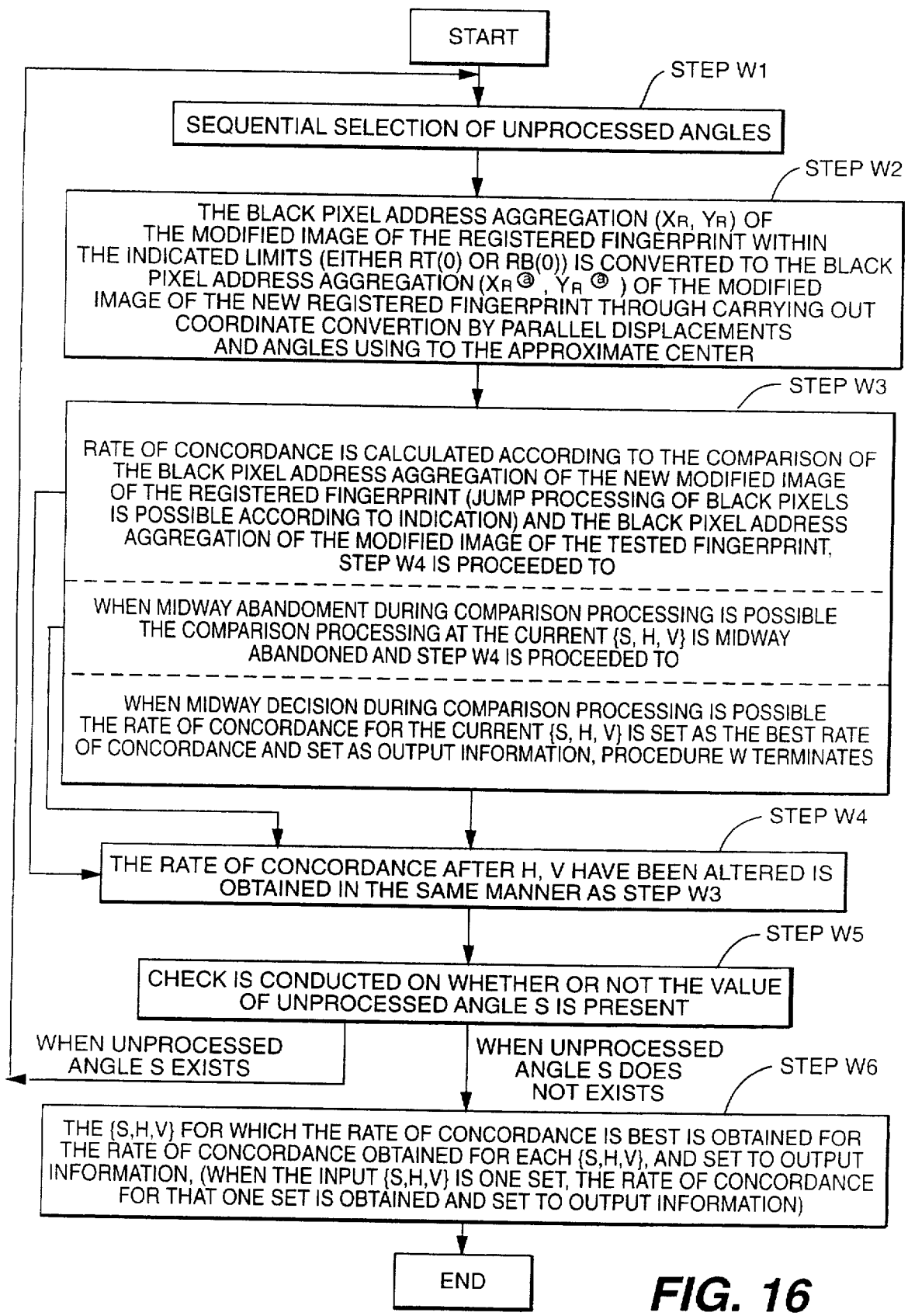
FIG. 16 is an abbreviated flow chart of the auxiliary image concordance check procedure for the check of image concordance (i.e., procedure W)

The processing of procedure W is shown below. FIG. 16 is an abbreviated flow chart of procedure W.
(Procedure W)
Step W1 (selection of angle S):

Depending on the input information of angle S, the value of S may be chosen sequentially by means of the incremental value of S from the smallest S value to the largest S value (i.e., the smallest value of S is Smin, the largest value of S is Smax and when the valse of the increment is Ks, S changes from Smin to Smax according to S=Smin, Smin+Ks, . . . ,Smax), and step W2 is proceeded to.

Step W2 (coordinate transposition according to angle S):

For the black pixels of the narrowization image of the inputted registered fingerprint (either RT(0) or RB(0)), with respect to the black pixel address which is to be investigated by the registered information search value (i.e., jump number) of the black pixels of the registered information
(1) when S=0, $X_R@=X_R-X_{RC}+X_{TC}$ $Y_R@=Y_R-Y_{RC}+Y_{TC}$
are set.
(2) when S≠0, Following parallel displacement to align the approximate center point ($X_{RC},Y_{RC}$) of the registered fingerprint to the approximate center point of the fingerprint undergoing testing ($X_{TC},Y_{TC}$), coordinate axis rotation by an angle of S degrees is carried out with respect to all the black pixel addresses ($X_R,Y_R$) of a black pixel aggregation of an image of an inputted registered fingerprint (either RT(0) or RB(0)). This is carried out according to, $$X_R@=(X_R-X_{RC})\cdot\cos(S)+(Y_R-Y_{RC})\cdot\sin(S)+X_{TC}$$

$$Y_R@=-(X_R-X_{RC})\cdot\sin(S)+(Y_R-Y_{RC})\cdot\cos(S)+Y_{TC}$$

According to this, an aggregation of an all black pixel address ($X_R@,Y_R@$) Of the new registered fingerprint at the time when H=V=0 is obtained.

According to the above, the approximate center ($X_{RC},Y_{RC}$) of the registered fingerprint is rotated S degrees about the coordinate axis of the registered fingerprint and an aggregation of an all black pixel address ($X_R@,Y_R@$) of the new registered fingerprint is obtained.
(refer to Remarks for W(3))
Step W3 (calculation of the rate of concordance T):
Step W3a:

The counter for the number of concordant black pixels Nm and the counter for the total number of black pixels Nc in the registered fingerprint are respectively set to "0" initially.

Step W3b:

For each address of the aggregation of ($X_R@,Y_R@$), the image of the fingerprint undergoing testing is checked, (1) If the aggregation is one of black pixels within the fingerprint area, "1" is added to the counter for the number of concordant black pixels Nm, and "1" is also added to the counter for the total number of black pixels Nc in the registered fingerprint.

(2) If the aggregation is one of white pixels within the fingerprint area, or if it is outside the fingerprint area (treated as neither white nor black), "1" is added to the counter for the total number of black pixels Nc in the registered fingerprint.

Here, whether or not midway abandonment of the comparison is possible for $\{S,H,V\}$ in the comparison processing of the sub-template is checked. In other words, for a predetermined number $\{Nci, Tci; i=1,2, \ldots ,k\}$, when counter $Nc = Nci$
($Nci$ and $k$ are predetermined numbers), Nm is set to Nmi (im=1,2, ... k) as the concordance match up to that point of the parameters set according to S, H, V, and, in the case where $Nmi/Nci < Tci$, ($i = 1,2, \ldots k$)
($Tci$ and $k$ are predetermined numbers.
Please refer to Remarks $W(1)$)

because, even should a subsequent check be conducted, there will not be a significant degree of concordance obtained at the current values of S, H, and V, the current S, H, and V values at this point are discarded and step W4 is proceeded to in order to advance to the next S, H, and V values.

Additionally, in the comparison processing of the sub-template when there is an indication of a midway decision (for example, construction may be accomplished so that indication is by the input information of procedure W), the next processing is carried out. When counter Nc=Ncd, in the case where $Nmi/Nci > Td$ -continued (Ncd, Td are predetermined numbers.
Please refer to Remarks W(2))

even if the following check is not carried out, because the rate of concordance is sufficient, step W3c is executed and the {S,H,V} at this time are decided as the {S,H,V} of the output information.

Step W3c:

When step W3b has been completed for all of the addresses of the aggregations of (XR@,YR@), $$T=Nm/Nc$$

is calculated, and Nm, Nc and T for this {S,H,V} is memory stored.

Step W4 (parallel displacement according to H and V):

For the black pixel address (X@,Y@) of the new registered fingerprint when H=V=0, H and V, which have been set in the H, V storage area are selected in sequence (when H=V=0, calculation has already been completed in step 3). When the values of H from its smallest value to its largest value and the values of V from its smallest value to its largest value are changed sequentially by each increment (i.e., the smallest value of H is Hmin, the largest is Hmax, when the increment value is Kh, the value of H changes according to H=Hmin, Hmin+Kh, . . . until the largest Kmax is reached; the smallest value of V is Vmin, the largest is Vmax, when the increment value is Kh, the value of H changes according to V=Vmin, Vmin+Kv, . . . ), because (X@-H, Y@-V) becomes the black pixel address aggregation of the new registered fingerprint following parallel displacement, processing identical to step W3 is carried out for each set of {S,H,V}, and the rate of concordance is memory stored.

Step W5 (check of unprocessed S):

When a value of an unprocessed S is present, step W1 is proceeded to.

When a value of an unprocessed S is not present, step W6 is proceeded to.

Step W6 (judgement on the largest rate of concordance):

For each {S,H,V}, according to each value of S and to the change in H=Hmin~Hmax, V=Vmin~Vmax, the values of S, H, and V when the values of Nm, Nc are obtained when $$T=Nm/Nc$$

is large, and are set as output information. When only one set of S, H, and V is respectively input, the current rate of concordance is set as output information.

(End of procedure W)

Remarks W(1): The value of Tci (i=1,2, . . . k) in step W3b is $0 \leq Tci \leq 1$. However it can, for example, be determined as follows. When the number of all the black pixels of a modified image of a registered fingerprint is set to Nc, Nci/Nc (i=1,2, . . . k) indicates the condition of the progression of the processing and the limits are $0 \leq Nci/Nc \leq 1$. As Nci increases and approaches Nc, because Nmi/Nci approaches Nm/Nc, which is the rate of concordance with respect to the {S,H,V} being currently checked, Tci may be set so that Nci is as large as possible. The larger Tci becomes, the wider the limits for midway abandonment become. There is a considerable effect on the decrease in the quantity of processing required. However, this benefit is offset by the fact that, due to the frequency with which errors in recognition are generated, it is necessary to set an appropriate value to Tci. The maximum frequency of this calculation is determined according to the set value of k (if midway abandonment of a comparison is carried out one time, the calculation for the possibility of midway abandonment for the values of {S,H,V} after that point is not necessary). It is necessary to set a concrete value of Tci according to the characteristics of the desired image. Furthermore, if the condition expression which sets the limits of the midway abandonment of the comparison also sets the midway concordance matching, the condition expression is not limited to the example shown is procedure W.

Remarks W(2): The value of Ncd and Td in step W3b is determined, for example, as follows. The value of Ncd is below the Nc which is the Nc with respect to the number of all of the pixels (Nc) of the modified image of the registered fingerprint, and is set to a value near Nc. Here, when N is not known beforehand, an assumed value may be used. The value of Td is less than 1 and is set to a value near 1. If the value of Td is made small, while the effect upon the reduction of processing is considerable, errors in recognition occur frequently.

Processing according to the designation of midway decision can be utilized for reducing the time of processing of the first step when, for example, carrying out the incremental value of {S,H,V} in step 2.

Remarks W(3): The method of step W2 is as follows. For all the addresses (XR,YR) in step W2, the new address following parallel displacement to make the approximate center point (XRC,YRC) of the registered fingerprint concordant to the approximate center point (XTC,YTC) of the fingerprint undergoing testing is $$X_R\# = X_R - (X_{RC} - X_{TC})$$

$$Y_R\# = Y_R - (Y_{RC} - Y_{TC})$$

and (XR#,YR#) become the new address. Next, coordinate rotation of S degrees is carried out about (XTC,YTC). This may be obtained according to $$X_R@ = (X_R\# - X_{TC})\cos(S) + (Y_R\# - Y_{TC})\sin(S) + X_{TC}$$
$$= (X_R - X_{RC})\cos(S) + (Y_R - Y_{RC})\sin(S) + X_{TC}$$

$$Y_R@ = -(X_R\# - X_{TC})\sin(S) + (Y_R\# - Y_{TC})\cos(S) + Y_{TC}$$
$$= -(X_R - X_{RC})\sin(S) + (Y_R - Y_{RC})\cos(S) + Y_{TC}.$$

Here, the values of the sine and cosine trigonometric functions may maintain the values of the limits of variation of the preset angle S.

XIII. Flow of Registration Processing and Comparison Processing

Figure 17:
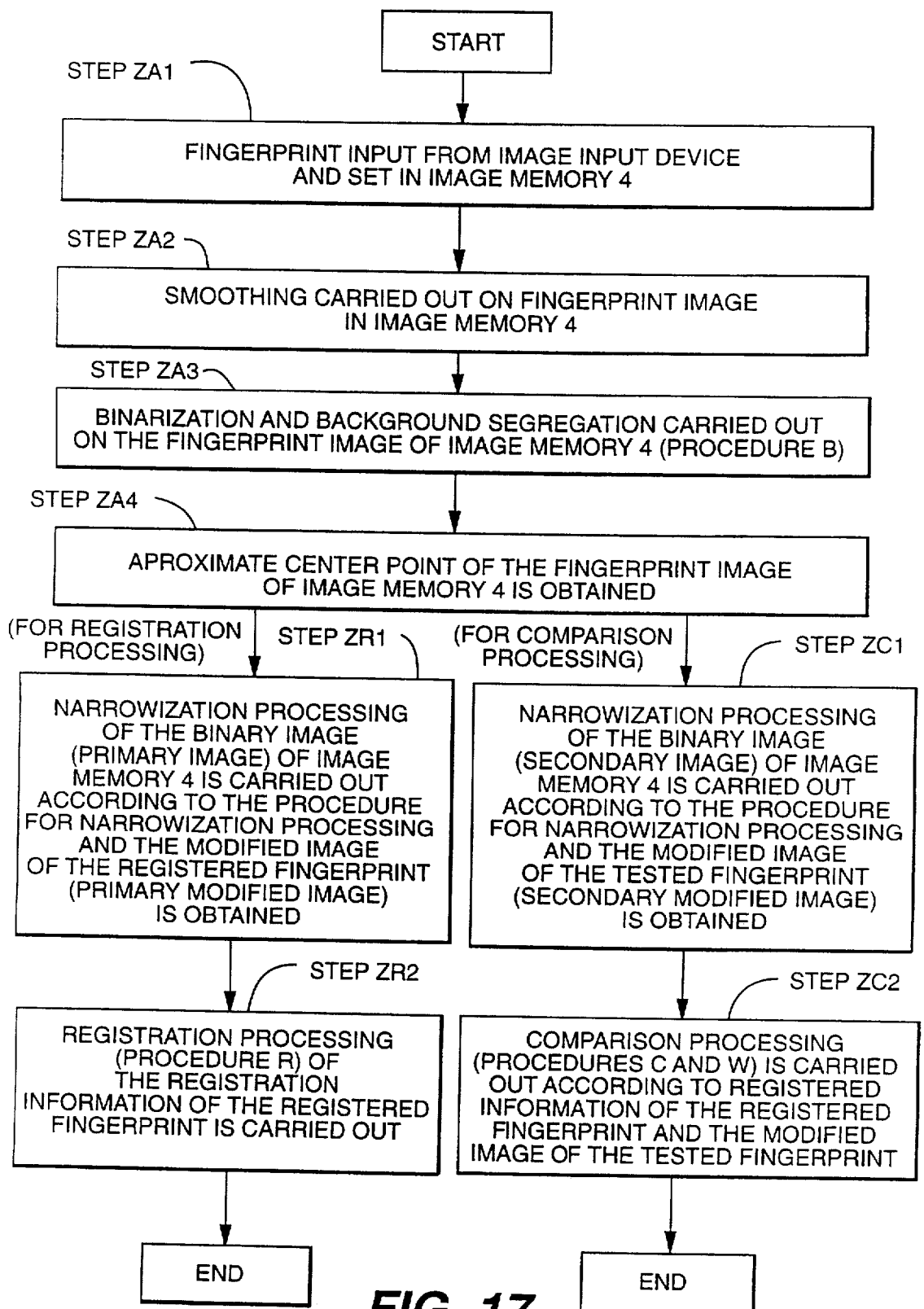
FIG. 17 is an example of an abbreviated flow chart of fingerprint input processing, registration processing and comparison processing.

The flow of the registration processing and the comparison processing of a fingerprint is shown in FIG. 17. Registration processing is the process of registering the registration information of a fingerprint in memory 6 of image processing device 1. Comparison processing is the process of judging the concordance of a fingerprint undergoing testing to a registered fingerprint. An abbreviation of the flow from input of the fingerprint through registration or comparison processing is shown in the following procedure Z.

(Procedure Z)

Steps ZA 1~ZA 5 are the in common processes of registration processing and comparison processing.

Step ZA 1:

Input of a fingerprint from image input device 2 to image memory 4.

Step ZA 2:

Smoothing of the gray scale image of the fingerprint in image 10 of image memory 4.

Step ZA 3:

Binarization and background segregation of image 10 through procedure B.

Step ZA 4:

Obtainment of the approximate center point of the fingerprint image in image 10.

(End of steps ZA 1–ZA 4)

The following processing is separated by registration and comparison processing.

Steps ZR 1–step ZR 2 are the registration processing and the recording of the registered information of the registered fingerprint in memory 6.

Step ZR 1:

Narrowization processing within the fingerprint area is carried out on the binary image (primary image) of the registered image in image 10, and a modified image of the registered fingerprint (primary modified image) is obtained.

Step ZR 2:

The processing of registered information of the registered fingerprint is carried out (procedure R).

(End of steps ZR 1–ZR 2)

Steps ZC 1–ZC 2 are for the case of comparison processing, and carry out the comparison of the fingerprint undergoing testing to the registered fingerprint.

Step ZC 1:

Narrowization is carried out with the fingerprint area of the binarized image of the tested fingerprint (secondary image) in image 10, and a modified image of the fingerprint undergoing testing (secondary modified image) is obtained.

Step ZC 2:

Judgement is made on the concordance of the registered fingerprint to the tested fingerprint through comparison processing (procedure C, procedure W).

(End of steps ZC 1–ZC 2)

The present invention is not limited to the above preferred embodiments, but may be expanded upon or altered as follows, for example, without impeding upon the effective utilization of the present invention. Furthermore, with respect to the method of image input, smoothing, binarization processing, background segregation processing, correction processing, processing to obtain the approximate center point, narrowization processing, and the method of calculation of the concordance and discordance in comparison processing, the claims of the invention of the present application are not intended to be limited by the preferred embodiments of the present invention, and variations or expansions which utilize some other method (i.e., a conventional method), or partial omissions are possible as well. The method of setting the X and Y coordinates is optional. In position matching, when the drift in the rotation is small enough to be ignored, only those errors in recognition for which parallel displacement is possible are checked, and the positioning of the images so that the greatest rate of concordance is achieved is detected. In step W2 of procedure W, when the conversion which carries out rotational and parallel displacement is performed, the expression for obtaining $X_R@$ and $Y_R@$ can be utilized. However, it is not intended to limit the preferred embodiments of the present invention in any manner. For example, it is also possible to utilize $$X_R@ = X_R \cdot \cos(S) + Y_R \cdot \sin(S)$$

$$Y_R@ = X_R \cdot \sin(S) + Y_R \cdot \cos(S).$$

Furthermore, the utilization of coordinate transformation or geometric transformation is not limited. The processing quantity necessary for comparison can be reduced due to the supplement of a value for carrying out rotational and parallel displacement of the sub-template as registered information (in this case, the memory quantity increases).

In the preferred embodiments of the invention of the present application, the case where the image is a fingerprint is disclosed, however, provided that the image is a constituted from lines, the present invention can be appropriately applied. Additionally, although in the preferred embodiments of the present invention, the case was presented wherein a single fingerprint to be tested was compared to a single registered fingerprint, the present invention may also be utilized to compare a fingerprint image undergoing testing to two or more registered fingerprints, and from the group of registered fingerprint to find the image with which the tested fingerprint has the greatest rate of concordance. The classification of the sub-template and non sub-template is not limited, and expansions such as classifying neither or setting many classifications are possible.

Effects of the Present Invention

In the present invention, because the width indicator value of the narrowization processing which is applied to primary image 1 (e.g., a registered fingerprint image) can be made less than the width indicator value of the narrowization processing applied to secondary image 2 (e.g., a tested fingerprint image), in the case where the original objects of the registered fingerprint and the nested fingerprint are the same, it is possible to make the line width of the primary modified image smaller than the line width of the secondary modified image at each corresponding area. Accordingly, when the individual black pixels of the primary modified image which is the registered information of the primary image are compared to the individual pixels of the secondary modified image which is the information based on the secondary image, the following effects are obtained. 1) Because the comparison of two images is possible without utilization of the characteristics points of an image, the complicated image correction processing (i.e., correction using line directions) necessary for extracting the characteristic points is not necessary. 2) Because the line width of the primary image can be set to be less than the line width of the secondary image, in the case where the primary image and the secondary image were obtained from the same object, errors caused by position displacements of the images are reduced. 3) Because the number of black pixels in an image which has undergone narrowization processing are less than the total number of black pixels in the original image, the memory quantity necessary for registered information is less than that required to store as is the original image.

By introducing the degree of the discordance between two images, it becomes possible to compare two images based on a comparison of the black pixels of the registered image against those of the tested image. As a result, the processing required for position matching is significantly reduced in comparison to the case when all black pixels of two images are checked, or the entire images, including black and white pixels, are checked. Because it is possible to carry out midway abandonment of a non-utilized comparison in the midway comparison abandonment processing, the processing quantity can be reduced. Further, due to the jump processing of the black pixels of registered information during a comparison, the comparison processing can be decreased. In the multi-step comparison procedure, due to the setting of the quantity of position matching of the image information to the multi-steps, comparison can be carried out through the primary step, which translates image information by a comparatively large translation quantity for comparatively large limits, and by the secondary step, which translates the image information by a comparatively small translation quantity for comparatively small limits, or by the repetition of these. Accordingly, compared to the case where the image information of one image is translated by a small quantity for the entire limits, the complete processing quantity can be decreased.

Due to the division and plural setting of the sub-template, there is no lowering of the recognition accuracy, and the processing quantity for position matching can be decreased more than the utilization of connective sub-template areas. Due to the division and establishment of one or more non sub-template and sub-template areas, the file quantity for registering the non sub-template section can be reduced.

In the case where the thinning process of the present invention is applied to a binary image, because the fine lining of a binary image can be realized through the processing of the connective sections of black pixels and through the processing which classifies unresolved pixels as black and white pixels according to the thinning decision data for unresolved pixels, thinning processing can be carried out rapidly. Further, because the maintenance of the connectivity of the black pixels when thinning the connective sections of black pixels is carried out through reference to the original binary image, and, because it is possible to maintain the connectivity of the black pixels when classifying unresolved pixels as black or white pixels by the contents of the thinning decision data for unresolved pixels and by other processing, an advantage is offered that the maintenance of the connectivity of the black pixel in the thinned image can be easily maintained.

From the image data memory storage process, the quantity of registered information of a fingerprint can be reduced. Furthermore, due to the procedure for the partial transformation of a registered image, the registered information quantity of the fingerprint can be reduced and the comparison processing quantity can also be decreased.

I claim:

1. An image processing method for judging whether a primary image representing a first fingerprint and a secondary image representing a second fingerprint originate from the same source, the method comprising the steps, performed by a computer system, of:

obtaining from an image input device a series of signals representing the primary image;

storing the series of signals in an image plane of a memory in the computer as pixels having brightness values;

dividing the pixels into sub-division areas;

obtaining binarization threshold values for the sub-division areas from the brightness values of the pixels in each sub-division area;

binarizing the brightness values of the pixels to produce a binarized primary image having black pixels forming lines and white pixels;

storing the binarized primary image in the memory;

narrowing the width of each line of the binarized primary image in the memory to one pixel, the narrowing step including the substeps of
selecting black pixels to be removed, and
converting the selected black pixels to white pixels to produce a narrowed primary image in the memory;

obtaining a series of signals representing the secondary image;

storing the series of signals as pixels having brightness values in the memory;

dividing the pixels of the secondary image into sub-division areas;

obtaining binarization threshold values for the sub-division areas from the brightness values of the pixels of each sub-division area;

binarizing the brightness value of the pixels of the secondary image in the memory using the binarization threshold values to produce a binarized secondary image having black pixels forming lines and white pixels;

obtaining a degree of concordance between the primary image and the secondary image by comparing the black pixels of the narrowed primary image and the black pixels of the binarized secondary image;

narrowing the width of the lines of the binarized secondary image in the memory to one pixel, the narrowing step including the substeps of
selecting black pixels to be removed, and
changing the selected black pixels to white pixels to produce a narrowed secondary image in the memory;

obtaining a degree of discordance between the primary image and the secondary image by comparing black pixels of the narrowed primary image in the memory and black pixels of the narrowed secondary image in the memory; and deciding whether the primary image and the secondary image originate from the same source according to the degree of concordance and the degree of discordance.

2. An image processing method according to claim 1
wherein the step of narrowing each line of the binarized primary image includes the substep of
using a thinning process to narrow each line of the binarized primary image, and
wherein the step of narrowing each line of the binarized secondary image includes the substep of
using a thinning process to narrow each line of the binarized secondary image in the memory.

3. An image processing method according to claim 2
wherein the step of obtaining a degree of concordance includes the substep of
using a total number of concordant black pixels between the black pixels of the narrowed primary image and the binarized secondary image within the region of comparison in the memory, and
wherein the step of obtaining a degree of discordance includes the substep of
using
a total number of black pixels of the narrowed primary image within the region of comparison (Nc),
a total number of black pixels of the narrowed secondary image within the region of comparison (Tnc),
a total number of concordant black pixels between the narrowed primary image and the binarized secondary image within the region of comparison (Nm), and
a process to obtain a value of |Tnc−Nm|/Nc.

4. An image processing apparatus for judging whether a primary image representing a first fingerprint and a secondary image representing a second fingerprint originate from the same source, the image processing apparatus comprising:

a memory having an image plane;

primary image input means for obtaining and inputting a series of signals representing the primary image from an image input device and for storing the primary image as a plurality of pixels in the image plane of the memory;

first binarization means for binarizing the pixels of the primary image in the memory, the first binarization means including means for dividing the pixels of the primary image into sub-division areas, means for obtaining binarization threshold values for the sub-division areas from brightness values of the pixels in each sub-division area, means for binarizing each brightness value of the pixels of the primary image in the memory using the binarization threshold values, and means for storing in the memory the binarized primary image produced by the means for binarizing and formed of black pixels forming lines and of white pixels;

first narrowing means for narrowing the width of each line of the binarized primary image in the memory to one pixel, the first narrowing means including means for selecting black pixels to be removed, and means for converting the selected black pixels to white pixels;

secondary image input means for obtaining and inputting a secondary image of the object represented as a plurality of pixels, the secondary image input means including means for storing the pixels of the secondary image in the memory;

secondary binarization means for binarizing the pixels of the secondary image in the memory, the secondary binarization means including means for dividing the pixels of the secondary image into sub-division areas, means for obtaining binarization threshold values for the sub-division areas from the brightness values of the pixels of each sub-division area, means for binarizing the brightness values of the pixels of the secondary image in the memory using the binarization threshold values, and means for storing the binarized secondary image produced by the means for binarizing and having black pixels forming lines and white pixels;

concordance calculation means for obtaining a degree of concordance between the primary image and the secondary image by comparing the black pixels of the narrowed primary image and the black pixels of the binarized secondary image to obtain the degree of concordance;

second narrowing means for narrowing the width of the lines of the binarized secondary image in the memory to one pixel, the second narrowing means including means for selecting black pixels to be removed, and means for converting the selected black pixels to white pixels to produce a narrowed secondary image in the memory;

discordance calculation means for obtaining a degree of discordance between the primary image and the secondary image by comparing black pixels of the narrowed primary image in the memory and black pixels of the narrowed secondary image in the memory to obtain the degree of discordance; and judgment means for deciding whether the primary image and the secondary image originate from the same source according to the degree of concordance and the degree of discordance.

5. An image processing apparatus according to claim 4 wherein the first narrowing means includes thinning means for narrowing each line of the binarized primary image in the memory, and wherein the second narrowing means includes thinning means for narrowing each line of the binarized secondary image in the memory.

6. An image processing apparatus according to claim 5, wherein means for using a total number of concordant black pixels between the black pixels of the narrowed primary image and the binarized secondary image within the region of comparison in the memory, and wherein the discordance calculation means includes means for using a total number of black pixels of the narrowed primary image within the region of comparison (Nc), a total number of black pixels of the narrowed secondary image within the region of comparison (Tnc), a total number of concordant black pixels between the narrowed primary image and the binarized secondary image within the region of comparison (Nm), and a process to obtain a value of |Tnc−Nm|/Nc.

7. An image processing apparatus for judging whether a primary image representing a first fingerprint and a secondary image representing a second fingerprint originate from the same source the primary and secondary images having black pixels forming lines and of white pixels, and the image processing apparatus comprising:

a memory for storing the pixels of the primary and secondary images, the black pixels being associated with black pixel addresses in the memory;

comparison means for translating the black pixel addresses for the black pixels of the primary image in predetermined displacement ranges by coordinate conversion to produce a translated primary image from the primary image, the translated primary image also having black pixel addresses associated with the black pixels, and for obtaining a degree of concordance between the translated primary image and the secondary image by comparing black pixels of the translated primary image to black pixels of the secondary image; and means for obtaining a degree of concordance at a checkpoint by comparing all of the black pixels of the translated primary image to the black pixels of the secondary image, so that:

when the degree of concordance becomes lower than a predetermined threshold value at the checkpoint, the comparison ends for the black pixels of the translated primary image, and the translated primary image and the secondary image are judged not to originate from the same source;

when the degree of concordance does not become lower than the predetermined threshold value at the checkpoint, the comparison continues for the black pixels of the translated primary image to obtain a degree of concordance between the black pixels of the translated primary image and the black pixels of the secondary image, wherein the comparison means includes means for determining whether the translated primary image and the secondary image originate from the same source when the degree of concordance is in a predetermined range, and means for deciding that the primary image and the secondary image originate from the same source, when it is determined by the means for determining that the translated primary image and the secondary image originate from the same source.

8. An image processing apparatus for judging whether a primary image representing a first fingerprint and a secondary image representing a second fingerprint originate from the same source the primary and secondary images having black pixels forming lines and white pixels, the image processing apparatus comprising:

a memory for storing the pixels of the primary and secondary images, the black pixels being associated with black pixel addresses in the memory comparison means for translating each of the black pixel addresses of the primary image in predetermined displacement ranges by coordinate conversion to produce at least one translated primary image from the primary image, the translated primary image also having black pixel addresses associated with the black pixels, and for obtaining a degree of concordance between the translated primary image and the secondary image by comparing black pixels of the translated primary image to black pixels of the secondary image; and means for obtaining a degree of concordance at a checkpoint by comparing all of the black pixels of the translated primary image to the black pixels of the secondary image, so that:

when the degree of concordance becomes higher than a predetermined threshold value at the checkpoint, the comparison does not continue for the black pixels of the translated primary image, and the translated primary image is determined to originate from the same source as the secondary image;

when the degree of concordance does not become higher than the predetermined threshold value at the checkpoint, the comparison continues for the black pixels of the translated primary image to obtain a degree of concordance between the black pixels of the translated primary image and the black pixels of the secondary image, wherein the comparison means includes means for determining whether the translated primary image and the secondary image originate from the same source by determining whether the degree of concordance lies in a predetermined range; and means for deciding that the primary image and the secondary image originate from the same source, when it is determined by the means for determining that the translated primary image and the secondary image originate from the same source.

9. An image processing apparatus for judging whether a primary image representing a first fingerprint and a secondary image representing a second fingerprint originate from the same source, the image processing apparatus comprising:

a memory having an image plane;

primary image input means for obtaining and inputting a series of signals representing the primary image from an image input device and for storing the primary image as a plurality of pixels in an image plane of the memory, the black pixels being associated with black pixel addresses;

first binarization means for binarizing pixels of the primary image in the memory, the first binarization means including means for dividing the pixels of the primary image into sub-division areas, means for obtaining binarization threshold values for the sub-division areas from brightness values of the pixels as each sub-division area, means for binarizing each brightness value of the pixels of the primary image in the memory using the binarization threshold values, and means for storing in the memory a binarized primary image having black pixels forming lines and white pixels;

narrowing means for narrowing the width of each line of the binarized primary image in the memory to one pixel, the narrowing means including means for selecting black pixels to be removed, and means for converting the selected black pixels to white pixels to produce a narrowed primary image in the memory;

secondary image input means for obtaining a secondary image of the object represented as a plurality of pixels;

means for storing the pixels of the secondary image in the memory;

second binarization means for binarizing the pixels of the secondary image in the memory, the secondary binarization means including means for dividing the pixels of the secondary image into sub-division areas, means for obtaining binarization threshold values for the sub-division areas using each average brightness value of each sub-division area, means for binarizing the brightness values of the pixels of the secondary image using the binarization threshold values, and means for storing a binarized secondary image having black pixels forming lines and white pixels;

translation means for translating the black pixel addresses for the narrowed primary image by coordinate conversion, the translation means including means for storing a translated primary image that originates from the narrowed primary image and consists of the translated black pixel addresses;

first translation means for translating the black pixels of the narrowed primary image by a set of first predetermined incremental values of rotational, horizontal, and vertical displacements and a set of first predetermined displacement ranges of rotational, horizontal, and vertical displacements from Smin to Smax, from Hmin to Hmax, and from Vmin to Vmax, respectively, to obtain a set of rotational, horizontal, and vertical displacement values, Sa, Ha, and Va respectively, that maximize a degree of concordance in the set of first predetermined displacement ranges;

second translation means for translating the black pixels of the narrowed primary image by a set of second predetermined incremental values of displacements and a set of second predetermined displacement ranges of rotational, horizontal, and vertical displacements from Sa–Da to Sa+Da, Ha–Dh to Ha+Dh, and Va–Dv to Va+Dv, respectively, for constants Da, Dh and Dv, starting from the set of rotational, horizontal and vertical displacement values obtained from the first translation means, to obtain a set of rotational, horizontal, and vertical displacement values that maximize the degree of concordance in the set of second predetermined displacement ranges;

comparison means for comparing black pixels of the translated primary image to black pixels of the binarized secondary image by calculating the degree of concordance; and judgment means for determining whether the primary and secondary images originate from the same source by judging that the degree of concordance is in a predetermined range.

10. An image processing apparatus for determining whether a primary image representing a first fingerprint and a secondary image representing a second fingerprint originate from the same source, the primary and secondary images having black pixels forming lines and white pixels, and the image processing apparatus comprising:

a memory for storing the pixels of the primary and secondary, images;

first narrowing means for narrowing the width of each line of the primary image in the memory to one pixel, the narrowing means including first means for selecting black pixels to be converted to white pixels, and second means for converting the selected black pixels from the first selecting means to white pixels to produce a narrowed primary image in the memory;

concordance calculation means for obtaining a degree of concordance between the primary image and the secondary image from each black pixel of the narrowed primary image and each black pixel of the secondary image;

second narrowing means for narrowing the width of each line of the secondary image in the memory to one pixel, the second narrowing means including second means for selecting black pixels to be converted, and second means for converting the selected black pixels from the second selecting means to white pixels to produce a narrowed secondary image in the memory;

discordance calculation means for obtaining a degree of discordance between the narrowed primary image and the narrowed secondary image from the black pixels of the primary image and black pixels of the secondary image; and judgment means for determining whether the primary and secondary images originate from the same source using the degree of concordance and the degree of discordance.

11. An image processing apparatus according to claim 10 wherein the first narrowing means includes first thinning means for thinning each line of the primary image in the memory;

wherein the second narrowing means includes second thinning means for thinning each line of the binarized secondary image in the memory;

wherein the concordance calculation means includes means for calculating the degree of concordance from a total number of concordant black pixels between the black pixels of the narrowed primary image and the secondary image within the region of comparison in the memory, and wherein the discordance calculation means includes means for calculating the degree of discordance from a total number of black pixels of the narrowed primary image within the region of comparison (Nc), a total number of black pixels of the narrowed secondary image within the region of comparison (Tnc), a total number of concordant black pixels between the narrowed primary image and the secondary image within the region of comparison (Nm), and process to obtain a value of |Tnc−Nm|/Nc.

* * * * *

UNITED STATES PATENT AND TRADEMARK OFFICE
CERTIFICATE OF CORRECTION

PATENT NO. : 5,537,484
DATED : July 16, 1996
INVENTOR(S) : Tetsuji KOBAYASHI

It is certified that error appears in the above-indentified patent and that said Letters Patent is hereby corrected as shown below:

Claim 6, Column 44, line 5, after "wherein", insert --the concordance calculation means includes--.

Claim 9, Column 45, line 67, should read --in-- not "as".

Claim 10, column 47, line 12, should read --secondary images-- not "secondary, images".

Signed and Sealed this

Fifth Day of August, 1997

*Attest:*

BRUCE LEHMAN

*Attesting Officer*     *Commissioner of Patents and Trademarks*